US012603739B2

(12) United States Patent
Wu et al.

(10) Patent No.: US 12,603,739 B2
(45) Date of Patent: Apr. 14, 2026

(54) METHOD AND DEVICE FOR WIRELESS COMMUNICATION IN UE AND BASE STATION

(71) Applicant: Apogee Networks, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

(21) Appl. No.: 18/600,805

(22) Filed: Mar. 11, 2024

(65) Prior Publication Data

US 2024/0214146 A1    Jun. 27, 2024

Related U.S. Application Data

(63) Continuation of application No. 17/364,895, filed on Jul. 1, 2021, now Pat. No. 11,962,529.

(30) Foreign Application Priority Data

Jul. 6, 2020    (CN) .......................... 202010639812.6
Jul. 13, 2020    (CN) .......................... 202010671045.7

(51) Int. Cl.
*H04L 5/00*          (2006.01)
*H04W 72/0446*      (2023.01)

(52) U.S. Cl.
CPC ....... *H04L 5/0048* (2013.01); *H04W 72/0446* (2013.01)

(58) Field of Classification Search
CPC .......................... H04L 5/0048; H04W 72/0446
See application file for complete search history.

(56) References Cited

U.S. PATENT DOCUMENTS

2020/0274749 A1    8/2020    Liu et al.
2020/0413414 A1    12/2020    Wu et al.
(Continued)

FOREIGN PATENT DOCUMENTS

CN          109548132 A      3/2019
CN          110012542 A      7/2019
(Continued)

OTHER PUBLICATIONS

Notification to Grant Patent Right for Invention of Chinese patent application No. CN202010639812.6 dated Mar. 25, 2024.
(Continued)

*Primary Examiner* — Duc C Ho
(74) *Attorney, Agent, or Firm* — Volpe Koenig

(57)          ABSTRACT

The present disclosure discloses a method and a device for wireless communications in a UE and a base station. A first node transmits a first signal; and monitors a first-type signaling in a first resource block in a first time window. The first signal is used for determining a first reference signal; the first node assumes a QCL parameter identical to a target reference signal for monitoring the first-type signaling in the first resource block in the first time window; the target reference signal is either the first reference signal or a second reference signal; whether the first time window belongs to a first-type time window is used for determining the target reference signal between the first reference signal and the second reference signal. The method provided above raises the chance of a node being served and resource utilization ratio in Unlicensed Spectrum.

8 Claims, 10 Drawing Sheets

(56)            References Cited

U.S. PATENT DOCUMENTS

| 2021/0068117 | A1* | 3/2021 | Wu | H04W 76/27 |
| 2021/0385837 | A1* | 12/2021 | Wu | H04W 72/21 |

FOREIGN PATENT DOCUMENTS

| CN | 110120859 | A | 8/2019 |
| CN | 110460360 | A | 11/2019 |
| CN | 110582095 | A | 12/2019 |
| CN | 110677909 | A | 1/2020 |
| CN | 110972324 | A | 4/2020 |
| CN | 111133824 | A | 5/2020 |
| CN | 111355565 | A | 6/2020 |
| IN | 202037020807 | A | 7/2020 |
| WO | 2019104470 | A1 | 6/2019 |
| WO | 2019161807 | A1 | 8/2019 |
| WO | 2020017905 | A1 | 1/2020 |
| WO | 2020088212 | A1 | 5/2020 |

OTHER PUBLICATIONS

Notification to Grant Patent Right for Invention of Chinese patent application No. CN202010671045.7 dated Mar. 21, 2024.
Supplementary Search Report of Chinese patent application No. CN202010671045.7 dated Mar. 13, 2024.
Huawei, HiSilicon "QCL indication of downlink control channel and beam management reference signals" 3GPP TSG RAN WG1 NR Ad Hoc Meeting R1-1700405 Jan. 20, 2017.
Qualcomm Incorporated "TP for DL signals and channels for NR-U" 3GPP TSG RAN WG1 Meeting #100e R1-2000954 Mar. 6, 2020.
First Office Action of Chinese patent application No. CN202010639812.6 dated Dec. 12, 2023.
First Office Action of Chinese patent application No. CN202010671045.7 dated Nov. 25,2023.
First Search Report of Chinese patent application No. CN202010639812.6 dated Dec. 8, 2023.
First Search Report of Chinese patent application No. CN202010671045.7 dated Nov. 21, 2023.
Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).
Third Generation Partnership Project, "Technical Specification Group Radio Access Network; Physical layer procedures for shared spectrum channel access (Release 16)," 3GPP TS 37.213 V16.1.0 (Mar. 2020).
Third Generation Partnership Project, "Technical Specification Group Radio Access Network; NR; Requirements for support of radio resource management (Release 16)," 3GPP TS 38.133 V16.3.0 (Mar. 2020).
Third Generation Partnership Project, "Technical Specification Group Radio Access Network; NR; Physical layer procedures for control (Release 16)," 3GPP TS 38.213 V16.1.0 (Mar. 2020).
Third Generation Partnership Project, "Technical Specification Group Radio Access Network; NR; Physical layer procedures for data (Release 16)," 3GPP TS 38.214 V16.1.0 (Mar. 2020).

* cited by examiner

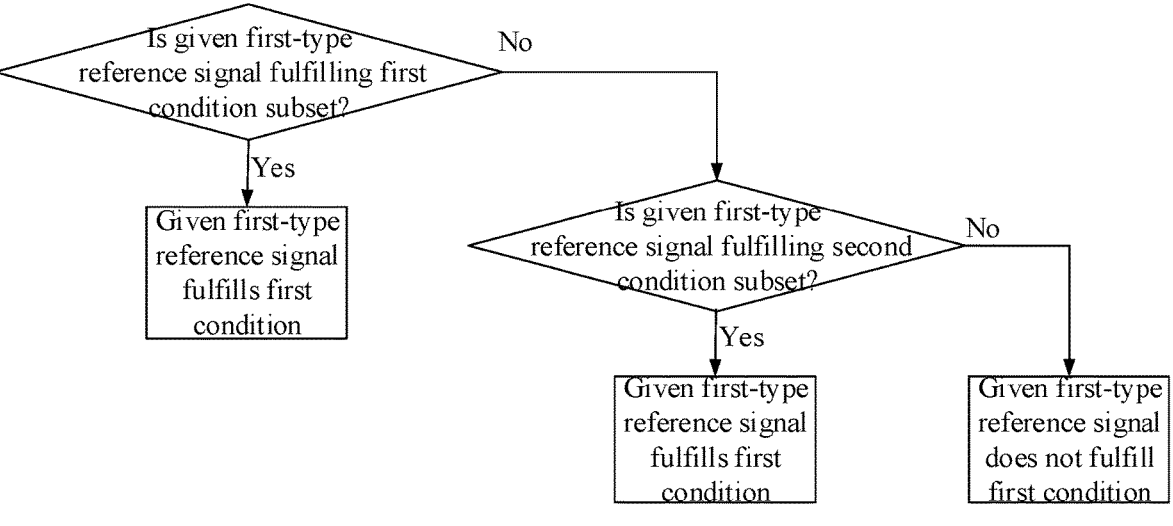
FIG. 11
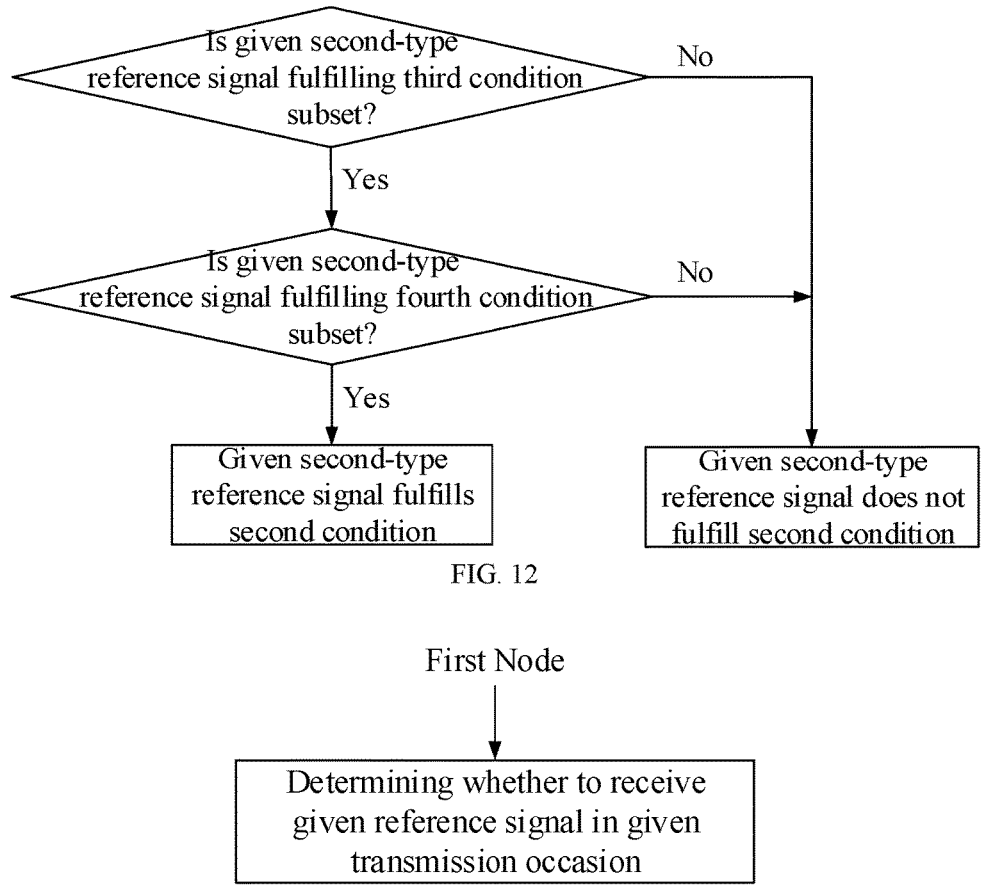
FIG. 12
First Node
Determining whether to receive
given reference signal in given
transmission occasion
FIG. 13

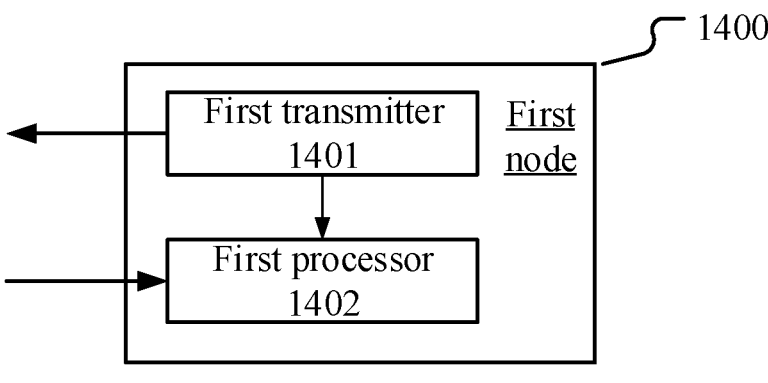

1400

First transmitter
1401

First node

First processor
1402

FIG. 14

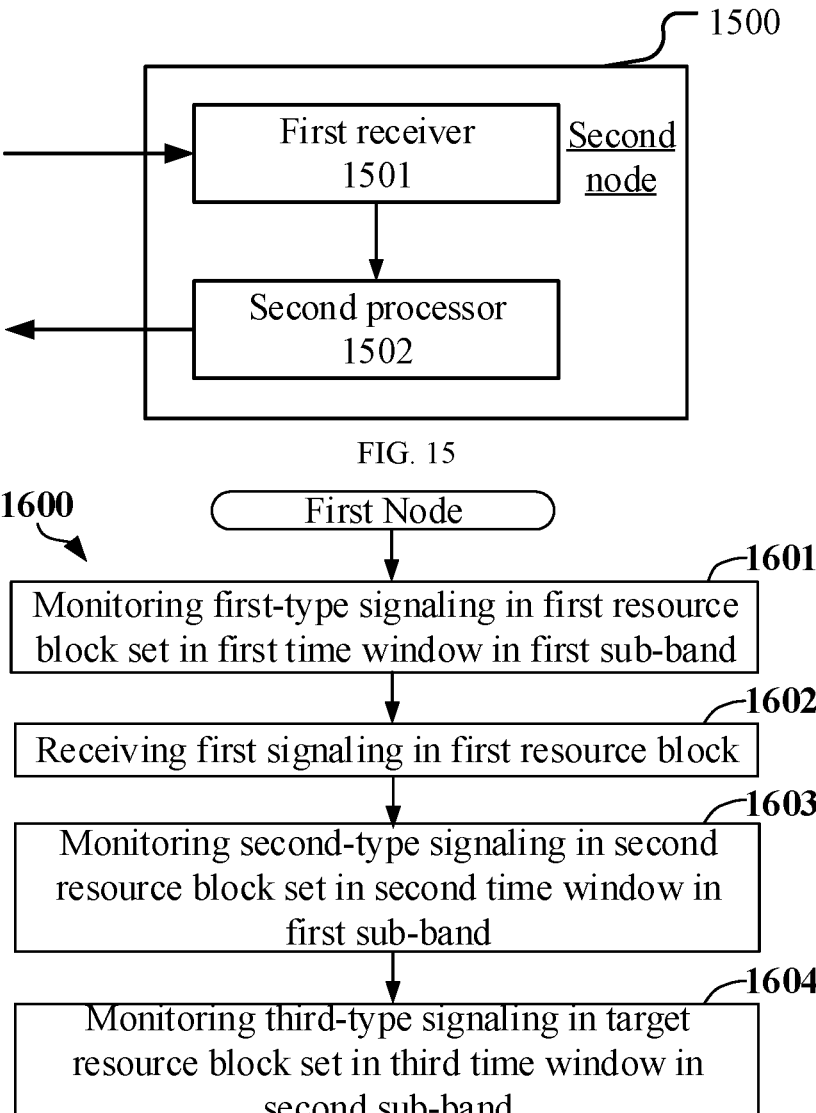

1500

First receiver
1501

Second node

Second processor
1502

First Node

1601
Monitoring first-type signaling in first resource block set in first time window in first sub-band 1602
Receiving first signaling in first resource block 1603
Monitoring second-type signaling in second resource block set in second time window in first sub-band 1604
Monitoring third-type signaling in target resource block set in third time window in second sub-band

FIG. 16

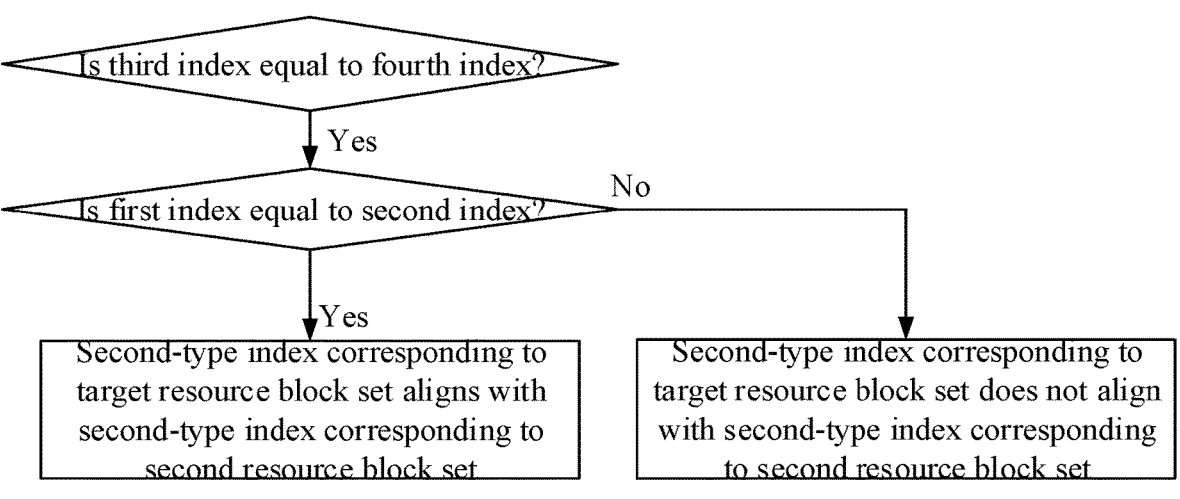
FIG. 24
First signaling —— used to determine ——▶ First reference time window —— used to determine ——▶ First reference time
FIG. 25
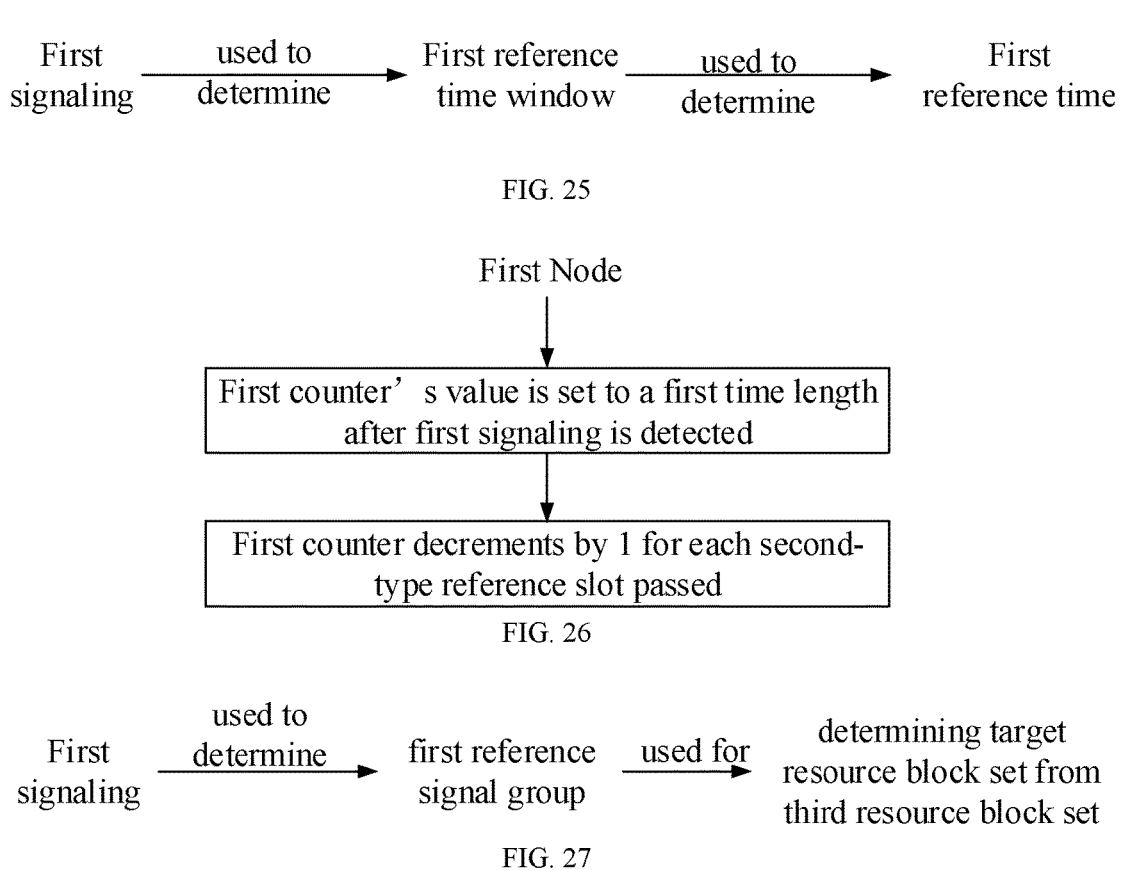
FIG. 26
First signaling —— used to determine ——▶ first reference signal group —— used for ——▶ determining target resource block set from third resource block set
FIG. 27

2800

First processor
2801

First
node

2900

Second processor
2901

Second
node

METHOD AND DEVICE FOR WIRELESS COMMUNICATION IN UE AND BASE STATION

CROSS REFERENCE TO RELATED APPLICATIONS

This application is the continuation of the U.S. patent application Ser. No. 17/364,895, filed on Jul. 1, 2021, and claims the priority benefit of Chinese Patent Application No. 202010639812.6, filed on Jul. 6, 2020 and the priority benefit of Chinese Patent Application No. 202010671045.7, filed on Jul. 13, 2020, the full disclosure of which is incorporated herein by reference.

BACKGROUND

Technical Field

The present disclosure relates to methods and devices for transmission in wireless communication systems, and in particular to a method and device of radio signal transmission in a wireless communication system supporting cellular network.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #75 plenary approved a study item (SI) of access to Unlicensed Spectrum of New Radio (NR), and later at the 3GPP RAN #78 Plenary it was decided that the access to Unlicensed Spectrum was supported in NR Release (R)15. In Long Term Evolution (LTE) and NR systems, a transmitter, i.e., a base station or a User Equipment (UE), shall first perform Listen Before Talk (LBT) before transmitting data on Unlicensed Spectrum to ensure no interference with other ongoing wireless transmissions on the Unlicensed Spectrum.

Massive MIMO is another important technical feature of the NR system, employing multiple antennas to form a narrow beam through beamforming that points in a specific direction, thus improving the communication quality. In the NR system, the massive MIMO is generally applied in Unlicensed Spectrum in the millimeter-wave band.

The uncertainty of LBT result will result in a reduction in the transmission opportunity of a transmitter, so that the density of transmission opportunity needs to be increased to achieve a higher resource utilization ratio. On the other hand, the increasing density of transmission opportunity will make the processing of the receiver more complicated. For the balance between resource utilization ratio and processing complexity, the concept of search space set group is introduced in NR R15, making it possible to switch a search space set group between inside and outside a channel occupancy time (COT), and transmission opportunity densities configured can vary with different search space set groups, which not only enhances the probability of the transmitter's channel occupancy but also avoids too much complexity in the receiver processing.

SUMMARY

Inventors find through researches that in beam-based Unlicensed Spectrum, since interference situations in different beam directions may vary a great deal, one or more beams available in a channel occupancy will change along with interference situations on different beams, which will have some impact on the beam management mechanism in Unlicensed Spectrum. To address the above problem, the present disclosure provides a solution. It should be noted that although only Unlicensed Spectrum and massive MIMO are stated above for example, the present disclosure is also applicable to scenarios such as Licensed Spectrum and other multi-antenna systems, where similar technical effects will be achieved. Additionally, the adoption of a unified solution for various scenarios (including but not limited to Licensed Spectrum, Unlicensed Spectrum, massive MIMO and other multi-antenna systems) contributes to the reduction of hardcore complexity and costs. If no conflict is incurred, the embodiments of the first node in the present disclosure and the characteristics in the embodiments can be applied to the second node, and vice versa. And the embodiments in the present disclosure and characteristics in the embodiments can be mutually combined if there is no conflict.

The NR R16 introduced multi-Transmitter Receiver Point (TRP) based repetitions of transmission for increasing the transmission reliability of data channel. Inventors find through researches that if different TRPs perform LBTs independently from each other, channel occupancies by any two TRPs will be mutually independent. Under such a circumstance, the switch of search space set group may be greatly influenced. To address the above problem, the present disclosure provides a solution. It should be noted that although only Unlicensed Spectrum and multi-TRP transmission scenario are stated above for example, the present disclosure is also applicable to scenarios such as Licensed Spectrum and single-TRP transmission, where similar technical effects will be achieved. Additionally, the adoption of a unified solution for various scenarios (including but not limited to Licensed Spectrum, Unlicensed Spectrum, multi-TRP transmission and single-TRP transmission) contributes to the reduction of hardcore complexity and costs. If no conflict is incurred, the embodiments of the first node in the present disclosure and the characteristics in the embodiments can be applied to the second node, and vice versa. And the embodiments in the present disclosure and characteristics in the embodiments can be mutually combined if there is no conflict.

The present disclosure provides a method in a first node for wireless communications, comprising:

transmitting a first signal; and monitoring a first-type signaling in a first resource block in a first time window in a first sub-band;

herein, the first signal is used to determine a first reference signal; for the monitoring on the first-type signaling in the first resource block in the first time window, the first node assumes same QCL parameters as a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, a problem to be solved in the present disclosure is how to determine available beam(s) in beam-based Unlicensed Spectrum. The method provided above determines a receiving/Rx beam depending on whether it is currently in the stage of a channel occupancy, thereby solving the problem.

In one embodiment, characteristics of the above method include that one said first-type time window is within a channel occupancy, and a reference signal group corresponding to the first-type time window represents one or more beams available in the channel occupancy; the first node determines a monitoring beam for a Physical Downlink Control CHannel (PDCCH) according to whether it is currently in the stage of a channel occupancy and based on available beam(s) within the channel occupancy.

In one embodiment, advantages of the above method include that by determining a beam used for monitoring a PDCCH from the currently available beams, a node is more likely to be served and the resource utilization ratio will get higher.

According to one aspect of the present disclosure, comprising:

receiving a first signaling;

herein, the first time window belongs to the target time window; the first signaling is used to determine the target time window and the target reference signal group.

According to one aspect of the present disclosure, comprising:

performing a first access detection; and transmitting a second signal upon completion of the first access detection;

herein, the first time window belongs to the target time window; the second signal is used to determine the target time window and the target reference signal group.

According to one aspect of the present disclosure, comprising:

determining whether a first condition is fulfilled for each first-type reference signal comprised in a first-type reference signal set;

herein, whether each first-type reference signal comprised in the first-type reference signal set fulfills the first condition is used to determine whether the first signal is transmitted; the first node determines that each first-type reference signal comprised in the first-type reference signal set fulfills the first condition, and determines to transmit the first signal; the given first-type reference signal is any first-type reference signal comprised in the first-type reference signal set, and a first transmission occasion set is reserved for the given first-type reference signal; when the given first-type reference signal fulfills one of a first condition subset and a second condition subset, the given first-type reference signal fulfills the first condition;

the first condition subset comprises: a number of transmission occasions comprised by a first occasion subset is greater than a first threshold; the first node drops receiving the given first-type reference signal in the first occasion subset, the first occasion subset being a subset of the first transmission occasion set;

the second condition subset comprises: a first received quality is lower than a second threshold; a measurement on the given first-type reference signal in a second occasion subset is used to determine the first received quality, and the first node receives the given first-type reference signal in the second occasion subset, the second occasion subset being a subset of the first transmission occasion set.

According to one aspect of the present disclosure, comprising:

determining whether to receive the given first-type reference signal in a first given transmission occasion;

herein, the first given transmission occasion is one transmission occasion in the first transmission occasion set.

According to one aspect of the present disclosure, comprising:

determining whether a second condition is fulfilled for each second-type reference signal comprised in a second-type reference signal set;

herein, a second-type reference signal subset is composed of second-type reference signals comprised in the second-type reference signal set that fulfill the second condition, and the first reference signal is a second-type reference signal in the second-type reference signal subset; a given second-type reference signal is any second-type reference signal comprised in the second-type reference signal set, and a second transmission occasion set is reserved for the given second-type reference signal; when the given second-type reference signal fulfills both a third condition subset and a fourth condition subset, the given second-type reference signal fulfills the second condition;

the third condition subset comprises: a number of transmission occasions comprised by a third occasion subset is greater than a third threshold; the first node receives the given second-type reference signal in the third occasion subset, the third occasion subset being a subset of the second transmission occasion set;

the fourth condition subset comprises: a second channel quality is greater than or equal to a fourth threshold; a measurement on the given second-type reference signal in the third occasion subset is used to determine the second channel quality.

According to one aspect of the present disclosure, comprising:

determining whether to receive the given second-type reference signal in a second given transmission occasion;

herein, the second given transmission occasion is one transmission occasion in the second transmission occasion set.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

receiving a first signal; and transmitting a first-type signaling in a first resource block in a first time window in a first sub-band, or, dropping transmitting the first-type signaling in the first resource block in the first time window in the first sub-band;

herein, the first signal is used to determine a first reference signal; a transmitter of the first signal assumes a QCL parameter identical to a target reference signal for monitoring the first-type signaling in the first resource block in the first time window in the first sub-band; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

According to one aspect of the present disclosure, comprising:

transmitting a first signaling;

herein, the first time window belongs to the target time window; the first signaling is used to determine the target time window and the target reference signal group.

According to one aspect of the present disclosure, comprising:

receiving a second signal;

herein, the first time window belongs to the target time window; the second signal is used to determine the target time window and the target reference signal group.

According to one aspect of the present disclosure, comprising:

determining whether to transmit a given first-type reference signal in a first given transmission occasion;

herein, the given first-type reference signal is any first-type reference signal comprised in a first-type reference signal set, and the first-type reference signal set is used to determine whether the first signal is transmitted; a first transmission occasion set is reserved for the given first-type reference signal, and the first given transmission occasion is one transmission occasion in the first transmission occasion set.

According to one aspect of the present disclosure, comprising:

determining whether to transmit a given second-type reference signal in a second given transmission occasion;

herein, the given second-type reference signal is any second-type reference signal comprised in a second-type reference signal set, and the first reference signal is a second-type reference signal in the second-type reference signal set; a second transmission occasion set is reserved for the given second-type reference signal, and the second given transmission occasion is one transmission occasion in the second transmission occasion set.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first transmitter, transmitting a first signal; and a first processor, monitoring a first-type signaling in a first resource block in a first time window in a first sub-band;

herein, the first signal is used to determine a first reference signal; for the monitoring on the first-type signaling in the first resource block in the first time window, the first node assumes same QCL parameters as a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

The present disclosure provides a second node for wireless communications, comprising:

a first receiver, receiving a first signal; and a second processor, transmitting a first-type signaling in a first resource block in a first time window in a first sub-band, or, dropping transmitting the first-type signaling in the first resource block in the first time window in the first sub-band;

herein, the first signal is used to determine a first reference signal; a transmitter of the first signal assumes a QCL parameter identical to a target reference signal for monitoring the first-type signaling in the first resource block in the first time window in the first sub-band; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

The present disclosure provides a method in a first node for wireless communications, comprising:

monitoring a first-type signaling in a first resource block set in a first time window in a first sub-band;

receiving a first signaling in a first resource block;

monitoring a second-type signaling in a second resource block set in a second time window in the first sub-band; and monitoring a third-type signaling in a target resource block set in a third time window in a second sub-band;

herein, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, a problem to be solved in the present disclosure includes how to achieve handover of search space set group when LBTs are performed independently among multiple TRPs in a multi-TRP transmission. By using a first-type index symbolizing TRP for determining in which cases the search space set group handover can be applied, the present disclosure offers a solution to the above problem.

In one embodiment, characteristics of the above method include that the first-type index is used for denoting a TRP corresponding to a resource block set, while the second-type index is used for denoting a search space set group corresponding to a resource block set; whether two resource block sets correspond to a same TRP is used to determine whether or not to switch to these two resource block sets simultaneously.

In one embodiment, advantages of the above method include supporting multiple TRPs in performing LBTs independently from each other in a multi-TRP transmission, and occupying or releasing a channel(s) according to the LBT results; the method improves resource utilization ratio and the flexibility.

According to one aspect of the present disclosure, comprising:

receiving a first information block;

herein, the first information block is used to determine a first index pair set; the first index pair set comprises K index pairs, K being a positive integer greater than 1; any index pair in the first index pair set comprises one said third-type index and one said first-type index; the third index-the first index pair belongs to the first index pair set; when the fourth index-the second index pair belongs to the first index pair set, the second-type index corresponding to the target resource block set aligns with the second-type index corresponding to the second resource block set; when the fourth index-the second index pair does not belong to the first index pair set, the second-type index corresponding to the target resource block set does not align with the second-type index corresponding to the second resource block set.

According to one aspect of the present disclosure, the above method is characterized in that when the third index is equal to the fourth index and the first index is equal to the second index, the second-type index corresponding to the target resource block set aligns with the second-type index corresponding to the second resource block set; when the third index is equal to the fourth index and the first index is unequal to the second index, the second-type index corresponding to the target resource block set does not align with the second-type index corresponding to the second resource block set.

According to one aspect of the present disclosure, the above method is characterized in that the first signaling is used to determine a first reference time window, an end of the first reference time window is used to determine a first reference time, and an end of the second time window is no later than the first reference time.

According to one aspect of the present disclosure, comprising:

setting a first counter's value to a first time length after detecting the first signaling.

According to one aspect of the present disclosure, comprising:

decrementing the first counter by 1 for each second-type reference slot passed;

herein, a third reference subcarrier spacing (SCS) is used to determine a length of one said second-type reference slot; a time of expiration of the first counter is used to determine a second reference time, and an end of the second time window is no later than the second reference time.

According to one aspect of the present disclosure, the above method is characterized in that the first signaling is used to determine a first reference signal group; any resource block comprised by the target resource block set is a resource block in a third resource block set; the first reference signal group is used to determine the target resource block set from the third resource block set.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first-type signaling in a first resource block set in a first time window in a first sub-band, or, dropping transmitting the first-type signaling in the first resource block set in the first time window in the first sub-band;

transmitting a first signaling in a first resource block;

transmitting a second-type signaling in a second resource block set in a second time window in the first sub-band, or, dropping transmitting the second-type signaling in the second resource block set in the second time window in the first sub-band; and transmitting a third-type signaling in a target resource block set in a third time window in a second sub-band, or, dropping transmitting the third-type signaling in the target resource block set in the third time window in the second sub-band;

herein, the first signaling is used for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

According to one aspect of the present disclosure, comprising:

transmitting a first information block;

herein, the first information block is used to determine a first index pair set; the first index pair set comprises K index pairs, K being a positive integer greater than 1; any index pair in the first index pair set comprises one said third-type index and one said first-type index; the third index-the first index pair belongs to the first index pair set; when the fourth index-the second index pair belongs to the first index pair set, the second-type index corresponding to the target resource block set aligns with the second-type index corresponding to the second resource block set; when the fourth index-the second index pair does not belong to the first index pair set, the second-type index corresponding to the target resource block set does not align with the second-type index corresponding to the second resource block set.

According to one aspect of the present disclosure, the above method is characterized in that when the third index is equal to the fourth index and the first index is equal to the second index, the second-type index corresponding to the target resource block set aligns with the second-type index corresponding to the second resource block set; when the third index is equal to the fourth index and the first index is unequal to the second index, the second-type index corresponding to the target resource block set does not align with the second-type index corresponding to the second resource block set.

According to one aspect of the present disclosure, the above method is characterized in that the first signaling is used to determine a first reference time window, an end of the first reference time window is used to determine a first reference time, and an end of the second time window is no later than the first reference time.

According to one aspect of the present disclosure, the above method is characterized in that a target receiver of the first signaling configures a first counter's value to a first time length after the first signaling is detected.

According to one aspect of the present disclosure, the above method is characterized in that the first counter is decremented by 1 for each second-type reference slot passed; a third reference subcarrier spacing (SCS) is used to determine a length of one said second-type reference slot; a time of expiration of the first counter is used to determine a second reference time, and an end of the second time window is no later than the second reference time.

According to one aspect of the present disclosure, the above method is characterized in that the first signaling is used to determine a first reference signal group; any resource block comprised by the target resource block set is a resource block in a third resource block set; the first reference signal group is used to determine the target resource block set from the third resource block set.

According to one aspect of the present disclosure, the above method is characterized in that the second node is a base station.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first processor, monitoring a first-type signaling in a first resource block set in a first time window in a first sub-band;

the first processor, receiving a first signaling in a first resource block;

the first processor, monitoring a second-type signaling in a second resource block set in a second time window in the first sub-band; and the first processor, monitoring a third-type signaling in a target resource block set in a third time window in a second sub-band;

herein, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

The present disclosure provides a second node for wireless communications, comprising:

a second processor, transmitting a first-type signaling in a first resource block set in a first time window in a first sub-band, or, dropping transmitting the first-type signaling in the first resource block set in the first time window in the first sub-band;

the second processor, transmitting a first signaling in a first resource block;

the second processor, transmitting a second-type signaling in a second resource block set in a second time window in the first sub-band, or, dropping transmitting the second-type signaling in the second resource block set in the second time window in the first sub-band; and the second processor, transmitting a third-type signaling in a target resource block set in a third time window in a second sub-band, or, dropping transmitting the third-type signaling in the target resource block set in the third time window in the second sub-band;

herein, the first signaling is used for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the present disclosure has the following advantages compared with the prior art:

determining an available beam or beams within one channel occupancy from the interference situations in different beam directions in beam-based Unlicensed Spectrum, thus enhancing the chance of channel occupancy and resource utility in the Unlicensed Spectrum.

determining a beam monitoring PDCCH according to whether a channel occupancy status is present and one or more beams available for the channel occupancy, thus raising the chance of a node being served and the transmission quality.

In one embodiment, the present disclosure has the following advantages compared with the prior art:

supporting independent LBTs performed by multiple TRPs in the multi-TRP transmission scenario and occupying or releasing channels separately according to LBT results.

improving resource utilization ratio and flexibility of the multi-TRP transmission scenario.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of determining whether a given first-type reference signal fulfills a first condition according to one embodiment of the present disclosure.

FIG. 12 illustrates a schematic diagram of determining whether a given second-type reference signal fulfills a second condition according to one embodiment of the present disclosure.

FIG. 13 illustrates a schematic diagram of a first node determining whether to receive a given first-type reference signal in a first given transmission occasion according to one embodiment of the present disclosure.

FIG. 14 illustrates a structure block diagram of a processing device in a first node according to one embodiment of the present disclosure.

FIG. 15 illustrates a structure block diagram of a processing device in a second node according to one embodiment of the present disclosure.

FIG. 16 illustrates a flowchart of a first-type signaling, a first signaling, a second-type signaling and a third-type signaling according to one embodiment of the present disclosure.

FIG. 24 illustrates a schematic diagram of a first index, a second index, a third index and a fourth index jointly being used to determine whether a second-type index corresponding to a target resource block set aligns with a second-type index corresponding to a second resource block set according to one embodiment of the present disclosure.

FIG. 25 illustrates a schematic diagram of a first signaling, a first reference time window and a first reference time according to one embodiment of the present disclosure.

FIG. 26 illustrates a schematic diagram of a first node configuring a first counter according to one embodiment of the present disclosure.

FIG. 27 illustrates a schematic diagram of a first signaling, a first reference signal group and a target resource block set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
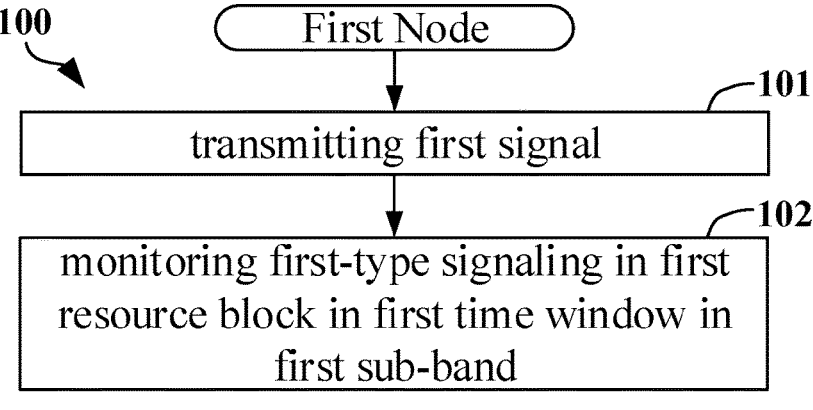
FIG. 1 illustrates a flowchart of a first signal and a first-type signaling according to one embodiment of the present disclosure.

Embodiment 1 illustrates a flowchart of a first signal and a first-type signaling according to one embodiment of the present disclosure, as shown in FIG. 1. In 100 illustrated by FIG. 1, each box represents a step. Particularly, the sequential order of steps arranged in the boxes does not imply any specific chronological order of these steps.

In Embodiment 1, the first node in the present disclosure transmits a first signal in step 101; and monitors a first-type signaling in a first resource block in a first time window in a first sub-band in step 102. Herein, the first signal is used to determine a first reference signal; for the monitoring on the first-type signaling in the first resource block in the first time window, the first node assumes same QCL parameters as a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the first signal comprises a baseband signal.

In one embodiment, the first signal comprises a radio signal.

In one embodiment, the first signal comprises a radio frequency signal.

In one embodiment, the first signal comprises a first characteristic sequence.

In one embodiment, the first characteristic sequence comprises a pseudo-random sequence.

In one embodiment, the first characteristic sequence comprises a Zadoff-Chu sequence.

In one embodiment, the first characteristic sequence comprises a low Peak-to-Average Power Ratio (PAPR) sequence.

In one embodiment, the first characteristic sequence comprises a Cyclic Prefix (CP).

In one embodiment, the first signal comprises a Random Access Channel (RACH) Preamble.

In one embodiment, the first signal comprises Uplink control information (UCI).

In one embodiment, the first signal comprises a Link Recovery Request (LRR).

In one embodiment, the first signal comprises a Medium Access Control layer Control Element (MAC CE).

In one embodiment, the first signal comprises a Beam Recovery Request (BRR).

In one embodiment, the first signal comprises a Beam Failure Recovery reQuest (BFRQ).

In one embodiment, the first signal comprises a beam failure instance indication.

In one embodiment, the first signal is transmitted on Unlicensed Spectrum.

In one embodiment, the first signal is transmitted on Licensed Spectrum.

In one embodiment, the first signal is transmitted on the first sub-band.

In one embodiment, the first signal is transmitted on a sub-band different from the first sub-band.

In one embodiment, the first signal and the first sub-band belong to a same serving cell in frequency domain.

In one embodiment, the first signal and the first sub-band belong to different serving cells in frequency domain.

In one embodiment, a serving cell to which the first signal belongs and a serving cell to which the first sub-band belongs are both parts of a first serving cell group.

In one embodiment, one or more of a time-domain resource, a frequency-domain resource or a code-domain resource occupied by the first signal is(are) used to determine the first reference signal.

In one embodiment, a Physical Random Access Channel (PRACH) resource occupied by the first signal is used to determine the first reference signal.

In one embodiment, a PRACH resource occupied by the first signal is one of W1 candidate PRACH resource(s), W1 being a positive integer; the W1 candidate PRACH resource(s) corresponds(correspond) to W1 reference signal(s) respectively; the first reference signal is a reference signal of the W1 reference signal(s) corresponding to the PRACH resource occupied by the first signal.

In one subembodiment, the W1 candidate PRACH resource(s) and the W1 reference signal(s) are respectively configured by higher layer signalings.

In one subembodiment, a correspondence relationship(s) between the W1 candidate PRACH resource(s) and the W1 reference signal(s) is(are) configured by higher layer signalings.

In one subembodiment, names of higher layer signalings used for configuring the W1 candidate PRACH resource(s) and the W1 reference signal(s) comprise BeamFailureRecovery.

In one subembodiment, any of the W1 candidate PRACH resource(s) comprises a time-domain resource, a frequency-domain resource and a code-domain resource.

In one embodiment, the code-domain resource comprises one or more of a pseudo-random sequence, a Zadoff-Chu sequence, a low PAPR sequence or a CP.

In one embodiment, the first signal indicates the first reference signal.

In one embodiment, the first signal comprises a bit field, the bit field indicating the first reference signal.

In one embodiment, the first sub-band is deployed on Unlicensed Spectrum.

In one embodiment, the first sub-band is deployed on Licensed Spectrum.

In one embodiment, the first sub-band comprises one carrier.

In one embodiment, the first sub-band comprises multiple carriers.

In one embodiment, the first sub-band comprises a Bandwidth Part (BWP).

In one embodiment, the first sub-band comprises multiple BWPs.

In one embodiment, the first sub-band comprises one Resource Block (RB) set or multiple consecutive RB sets in a BWP.

In one embodiment, the first sub-band is a contiguous frequency-domain zone.

In one embodiment, the first sub-band comprises a positive integer number of consecutive subcarriers.

In one embodiment, the first-type signaling comprises a physical layer signaling.

In one embodiment, the first-type signaling comprises a dynamic signaling.

In one embodiment, the first-type signaling comprises a layer 1 (L1) signaling.

In one embodiment, the first-type signaling comprises a layer 1 (L1) control signaling.

In one embodiment, the first-type signaling comprises Downlink control information (DCI).

In one embodiment, the first-type signaling comprises one or more of fields of a piece of DCI.

In one embodiment, the first-type signaling comprises one or more of fields of a piece of Sidelink Control Information (SCI).

In one embodiment, Cyclic Redundancy Check (CRC) of the first-type signaling is scrambled by a Cell-Radio Network Temporary Identifier (C-RNTI) or a Modulation and Coding Scheme (MCS)-C-RNTI.

In one embodiment, the monitoring refers to blind decoding, that is, receiving a signal and performing decoding; if the decoding is determined to be correct according to a CRC bit, it is determined that a said first-type signaling is detected; otherwise, it is determined that the first-type signaling is not detected.

In one embodiment, the monitoring refers to reception based on coherent detection, namely, performing coherent reception and measuring energy of a signal obtained by the coherent reception; if the energy of the signal obtained by the coherent reception is greater than a first given threshold, it is determined that a said first-type signaling is detected; otherwise, it is determined that the first-type signaling is not detected.

In one embodiment, the monitoring refers to reception based on energy detection, that is, sensing energy of a radio signal and averaging to acquire a received energy; if the received energy is greater than a second given threshold, it is determined that a said first-type signaling is detected; otherwise, it is determined that the first-type signaling is not detected.

In one embodiment, the phrase of monitoring a first-type signaling means that the first node determines whether the first-type signaling is to be transmitted according to CRC.

In one embodiment, the phrase of monitoring a first-type signaling means that the first node is uncertain about whether the first-type signaling is to be transmitted before determining whether the decoding is correct or not according to CRC.

In one embodiment, the phrase of monitoring a first-type signaling means that the first node determines according to coherent detection whether the first-type signaling is to be transmitted.

In one embodiment, the phrase of monitoring a first-type signaling means that the first node is uncertain about whether the first-type signaling is to be transmitted or not before coherent detection.

In one embodiment, the phrase of monitoring a first-type signaling means that the first node determines according to energy detection whether the first-type signaling is to be transmitted.

In one embodiment, the phrase of monitoring a first-type signaling means that the first node is uncertain about whether the first-type signaling is to be transmitted or not before energy detection.

In one embodiment, the first time window belongs to the first-type time window.

In one embodiment, the first time window does not belong to the first-type time window.

In one embodiment, the first reference signal and a reference signal in the target reference signal group are QCL.

In one embodiment, the first reference signal is not QCL with any reference signal in the target reference signal group.

In one embodiment, the phrase of QCL refers to Quasi-Co-Located.

In one embodiment, the phrase of QCL comprises QCL Type-A.

In one embodiment, the phrase of QCL comprises QCL Type-B.

In one embodiment, the phrase of QCL comprises QCL Type-C.

In one embodiment, the phrase of QCL comprises QCL Type-D.

In one embodiment, the phrase that "for the monitoring on the first-type signaling in the first resource block in the first time window, the first node assumes same QCL parameters as a target reference signal" includes a meaning that the first node assumes that an antenna port of the first-type signaling transmitted in the first resource block is QCLed with the target reference signal.

In one embodiment, the phrase that "for the monitoring on the first-type signaling in the first resource block in the first time window, the first node assumes same QCL parameters as a target reference signal" includes a meaning that the first node assumes that an antenna port of the first-type signaling transmitted in the first resource block is QCLed with the target reference signal, corresponding to a QCL-TypeD.

In one embodiment, the phrase that "for the monitoring on the first-type signaling in the first resource block in the first time window, the first node assumes same QCL parameters as a target reference signal" includes a meaning that the first node uses a same spatial domain filter to receive the target reference signal and monitor the first-type signaling in the first resource block.

In one embodiment, the phrase that "for the monitoring on the first-type signaling in the first resource block in the first time window, the first node assumes same QCL parameters as a target reference signal" includes a meaning that the first node uses a same spatial domain filter to transmit the target reference signal and monitor the first-type signaling in the first resource block.

In one embodiment, the phrase that "for the monitoring on the first-type signaling in the first resource block in the first time window, the first node assumes same QCL parameters as a target reference signal" includes a meaning that large-scale properties of a channel that the first-type signaling transmitted in the first resource block goes through can be inferred from large-scale properties of a channel that the target reference signal goes through.

In one embodiment, the large-scale properties include one or more of a delay spread, a Doppler spread, a Doppler shift, an average delay or a Spatial Rx parameter.

In one embodiment, the first reference signal comprises a Channel State Information-Reference Signal (CSI-RS).

In one embodiment, the first reference signal comprises a Synchronisation Signal/physical broadcast channel Block (SSB).

In one embodiment, the first reference signal comprises a Sounding Reference Signal (SRS).

In one embodiment, the second reference signal comprises a CSI-RS.

In one embodiment, the second reference signal comprises an SSB.

In one embodiment, the second reference signal comprises an SRS.

In one embodiment, the first reference signal and the second reference signal cannot be assumed to be QCL.

In one embodiment, the first reference signal and the second reference signal cannot be assumed to be QCL, corresponding to a QCL-TypeD.

In one embodiment, the second reference signal is configured by a higher layer signaling.

In one embodiment, the second reference signal is indicated by the first signal.

In one embodiment, a search space set to which the first resource block belongs is a first search space set, the first node assumes same QCL parameters as the second reference signal for monitoring the first-type signaling in the first search space set in a latest monitoring occasion of the first search space set before transmitting the first signal.

In one embodiment, a search space set to which the first resource block belongs is a first search space set, the first node assumes same QCL parameters as the second reference signal for monitoring the first-type signaling in the first search space set in a latest monitoring occasion of the first search space set before a first time point; the first time point is a start time of a fourth slot subsequent to a slot to which the first signal belongs.

In one embodiment, a COntrol REsource SET (CORE-SET) associated with the first resource block is a first CORESET, and the second reference signal is a latest reference signal indicated for the first CORESET by a MAC CE activating command comprising an identifier of the first CORESET received by the first node before transmitting the first signal.

In one embodiment, a CORESET associated with the first resource block is a first CORESET, and the second reference signal is a latest reference signal indicated for the first CORESET by a MAC CE activating command comprising an identifier of the first CORESET received by the first node before a first time point; the first time point is a start time of a fourth slot subsequent to a slot to which the first signal belongs.

In one embodiment, the second reference signal is a reference signal corresponding to a PRACH resource occupied by a latest random access of the first node before transmitting the first signal.

In one embodiment, the second reference signal is a reference signal corresponding to a PRACH resource occupied by a latest random access of the first node before a first time point; the first time point is a start time of a fourth slot subsequent to a slot to which the first signal belongs.

In one embodiment, the target reference signal group comprises one or more than one reference signal.

In one embodiment, any reference signal in the target reference signal group is a CSI-RS or an SSB.

In one embodiment, any reference signal in the target reference signal group is an SSB.

In one embodiment, any two reference signals in the target reference signal group are not QCLed.

In one embodiment, the second reference signal is a reference signal in the target reference signal group.

In one embodiment, the target reference signal group comprises K reference signals, K being a positive integer greater than 1; the K reference signals respectively correspond to K indexes, and the K indexes are used to determine the second reference signal out of the K reference signals; the K indexes are non-negative integers, respectively.

In one subembodiment, the second reference signal is one of the K reference signals corresponding to a minimum index.

In one subembodiment, the second reference signal is one of the K reference signals corresponding to a maximum index.

In one subembodiment, the K indexes are configured by higher layer signalings.

In one subembodiment, the correspondence relationship between the K reference signals and the K indexes is configured by a higher layer signaling.

In one subembodiment, the K indexes are UE-specific.

In one embodiment, the first node feeds back K1 reference signals to a transmitter of the first-type signaling, K1 being a positive integer greater than 1; a target reference signal sub-group is an intersection of the target reference signal group and the K1 reference signals; the K1 reference signals respectively correspond to K1 indexes, the K1 indexes being non-negative integers, respectively; the second reference signal is a reference signal corresponding to a minimum index in the target reference signal sub-group.

In one subembodiment, any of the K1 reference signals is a CSI-RS or an SSB.

In one subembodiment, the correspondence relationship between the K1 reference signals and the K1 indexes is configured by a higher layer signaling.

In one subembodiment, the correspondence relationship between the K1 reference signals and the K1 indexes is autonomously determined by the first node.

In one embodiment, the target reference signal is used to determine a time-domain resource occupied by the first resource block.

In one embodiment, the target reference signal is QCLed with a third reference signal of K0 reference signals, K0 being a positive integer greater than 1; K0 transmission occasion sets respectively correspond to the K0 reference signals, and a transmission occasion occupied by the first resource block belongs to one of the K0 transmission occasion sets that corresponds to the third reference signal.

In one subembodiment, each of the K0 reference signals is an SSB.

In one subembodiment, any two of the K0 reference signals are not QCLed.

In one subembodiment, the K0 transmission occasion sets are configured by higher layer signalings.

Embodiment 2

Figure 2:
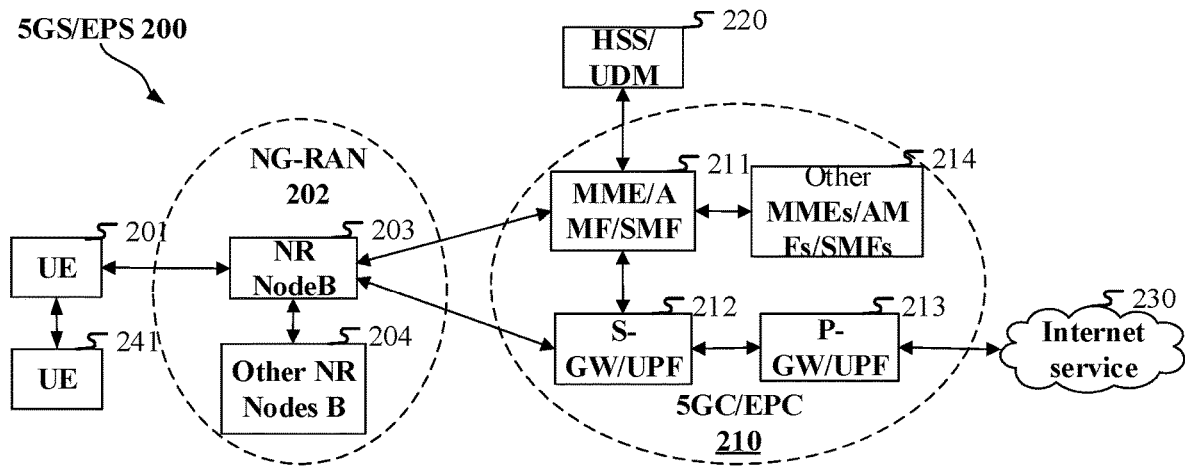
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), and Long-Term Evolution Advanced (LTE-A) and future 5G systems. The 5G NR or LTE network architecture 200 may be called a 5G System (5GS)/Evolved Packet System (EPS) 200. The 5GS/EPS 200 may comprise one or more UEs 201, a UE241 in sidelink communication with UE(s) 201, an NG-RAN 202, a 5G-CoreNetwork/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5GC/EPC 210 via an S1/NG interface. The 5GC/EPC 210 comprises a Mobility Management Entity (MME)/Authentication Management Field (AMF)/Session Management Function (SMF) 211, other MMEs//AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212; the S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Services.

In one embodiment, the first node in the present disclosure comprises the UE 201.

In one embodiment, the first node in the present disclosure comprises the UE 241.

In one embodiment, the second node in the present disclosure comprises the gNB203.

In one embodiment, the second node in the present disclosure comprises the UE 241.

In one embodiment, a radio link between the UE201 and the gNB203 is a cellular link.

In one embodiment, a radio link between the UE201 and the UE 241 is a sidelink.

In one embodiment, a transmitter of the first signal in the present disclosure includes the UE201.

In one embodiment, a receiver of the first signal in the present disclosure includes the gNB203.

In one embodiment, a transmitter of the first-type signaling in the present disclosure includes the gNB203.

In one embodiment, a receiver of the first-type signaling in the present disclosure includes the UE201.

In one embodiment, a transmitter of the first signaling in the present disclosure includes the gNB203.

In one embodiment, a receiver of the first signaling in the present disclosure includes the UE201.

In one embodiment, a transmitter of the second-type signaling in the present disclosure includes the gNB203.

In one embodiment, a receiver of the second-type signaling in the present disclosure includes the UE201.

In one embodiment, a transmitter of the third-type signaling in the present disclosure includes the gNB203.

In one embodiment, a receiver of the third-type signaling in the present disclosure includes the UE201.

In one embodiment, a transmitter of the first information block in the present disclosure includes the gNB203.

In one embodiment, a receiver of the first information block in the present disclosure includes the UE201.

Embodiment 3

Figure 3:
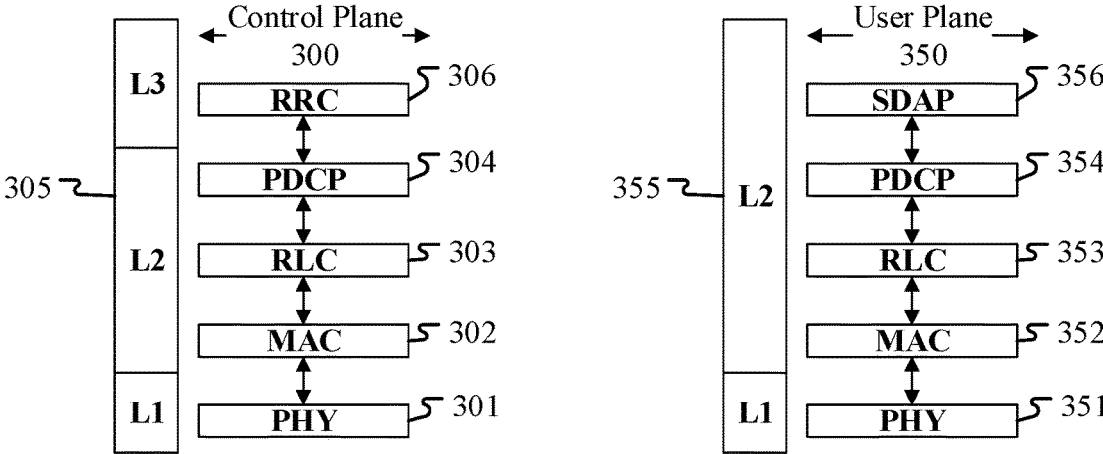
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal is generated by the PHY301 or the PHY351.

In one embodiment, the first-type signaling is generated by the PHY301 or the PHY351.

In one embodiment, the first-type signaling is generated by the MAC sublayer 302 or the MAC sublayer 352.

In one embodiment, the first signaling is generated by the PHY301 or the PHY351.

In one embodiment, the first signaling is generated by the MAC sublayer 302 or the MAC sublayer 352.

In one embodiment, the second-type signaling is generated by the PHY301 or the PHY351.

In one embodiment, the second-type signaling is generated by the MAC sublayer 302 or the MAC sublayer 352.

In one embodiment, the third-type signaling is generated by the PHY301 or the PHY351.

In one embodiment, the third-type signaling is generated by the MAC sublayer 302 or the MAC sublayer 352.

In one embodiment, the first information block is generated by the RRC sublayer 306.

Embodiment 4

Figure 4:
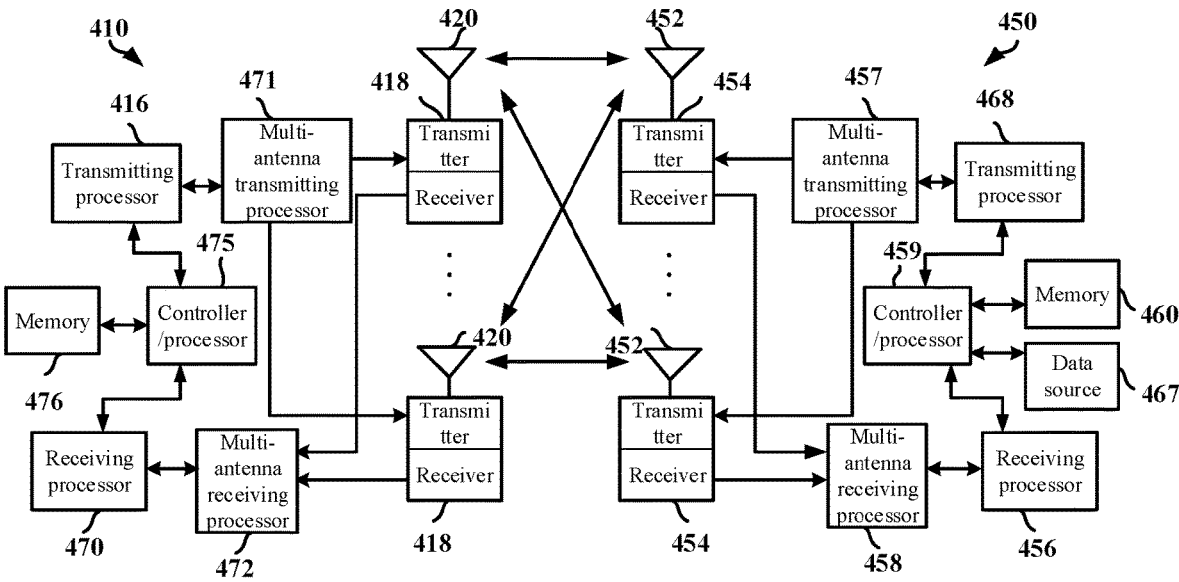
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also responsible for using ACK/NACK protocols in error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also responsible for using ACK/NACK protocols in error detection as a way to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least transmits the first signal; and monitors the first-type signaling in the first resource block in the first time window in the first sub-band. Herein, for the monitoring on the first-type signaling in the first resource block in the first time window, the second communication device 450 assumes a QCL parameter identical to a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the second communication device 450 comprises a memory that stores computer readable instruction program, the computer readable instruction program generates actions when executed by at least one processor, which include: transmitting the first signal; and monitoring the first-type signaling in the first resource block in the first time window in the first sub-band. Herein, for the monitoring on the first-type signaling in the first resource block in the first time window, the second communication device 450 assumes a QCL parameter identical to a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first signal; transmits the first-type signaling in the first resource block in the first time window in the first sub-band, or drops transmitting the first-type signaling in the first resource block in the first time window in the first sub-band. Herein, the first signal is used to determine a first reference signal; a transmitter of the first signal assumes a QCL parameter identical to a target reference signal for monitoring the first-type signaling in the first resource block in the first time window in the first sub-band; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the first communication device 410 comprises a memory that stores computer readable instruction program, the computer readable instruction program generates actions when executed by at least one processor, which include: receiving the first signal; transmitting the first-type signaling in the first resource block in the first time window in the first sub-band, or dropping transmitting the first-type signaling in the first resource block in the first time window in the first sub-band. Herein, the first signal is used to determine a first reference signal; a transmitter of the first signal assumes a QCL parameter identical to a target reference signal for monitoring the first-type signaling in the first resource block in the first time window in the first sub-band; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the first node in the present disclosure includes the second communication device 450.

In one embodiment, the second node in the present disclosure includes the first communication device 410.

In one embodiment, at least one of the antenna 420, the receiver 418, the receiving processor 470, the multi-antenna receiving processor 472, the controller/processor 475 or the memory 476 is used for receiving the first signal; at least one of the antenna 452, the transmitter 454, the transmitting processor 468, the multi-antenna transmitting processor 457, the controller/processor 459 or the memory 460 is used for transmitting the first signal.

In one embodiment, at least one of the antenna 452, the receiver 454, the receiving processor 456, the multi-antenna receiving processor 458, the controller/processor 459, the memory 460 or the data source 467 is used for monitoring the first-type signaling in the first resource block in the first time window in the first sub-band.

In one embodiment, at least one of the antenna 420, the transmitter 418, the transmitting processor 416, the multi-antenna transmitting processor 471, the controller/processor 475 or the memory 476 is used for transmitting the first-type signaling in the first resource block in the first time window in the first sub-band.

In one embodiment, at least one of the antenna 452, the receiver 454, the receiving processor 456, the multi-antenna receiving processor 458, the controller/processor 459 or the memory 460 is used for receiving the first signaling; at least one of the antenna 420, the transmitter 418, the transmitting processor 416, the multi-antenna transmitting processor 471, the controller/processor 475 or the memory 476 is used for transmitting the first signaling.

In one embodiment, at least one of the antenna 452, the receiver 454, the receiving processor 456 or the multi-antenna receiving processor 458 is used for performing the first access detection.

In one embodiment, at least one of the antenna 420, the receiver 418, the receiving processor 470, the multi-antenna receiving processor 472, the controller/processor 475 or the memory 476 is used for receiving the second signal; at least one of the antenna 452, the transmitter 454, the transmitting processor 468, the multi-antenna transmitting processor 457, the controller/processor 459 or the memory 460 is used for transmitting the second signal.

In one embodiment, at least one of the antenna 452, the receiver 454, the receiving processor 456 or the multi-antenna receiving processor 458 is used for determining whether each first-type reference signal in the first-type reference signal set fulfills the first condition.

In one embodiment, at least one of the antenna 452, the receiver/transmitter 454, the receiving processor 456, the transmitting processor 468, the multi-antenna receiving processor 458 or the multi-antenna transmitting processor 457 is used for determining whether to receive the given first-type reference signal in the first given transmission occasion; at least one of the antenna 420, the receiver/transmitter 418, the receiving processor 470, the transmitting processor 416, the multi-antenna receiving processor 472 or the multi-antenna transmitting processor 471 is used for determining whether to transmit the given first-type reference signal in the first given transmission occasion.

In one embodiment, at least one of the antenna 452, the receiver 454, the receiving processor 456 or the multi-antenna receiving processor 458 is used for determining whether each second-type reference signal in the second-type reference signal set fulfills the second condition.

In one embodiment, at least one of the antenna 452, the receiver/transmitter 454, the receiving processor 456, the transmitting processor 468, the multi-antenna receiving processor 458 or the multi-antenna transmitting processor 457 is used for determining whether to receive the given second-type reference signal in the second given transmission occasion; at least one of the antenna 420, the receiver/transmitter 418, the receiving processor 470, the transmitting processor 416, the multi-antenna receiving processor 472 or the multi-antenna transmitting processor 471 is used for determining whether to transmit the given second-type reference signal in the second given transmission occasion.

In one embodiment, the second communication device 450 comprises at least one processor and at least one memory, the at least one memory comprises computer program codes; the at least one memory and the computer program codes are configured to be used in collaboration with the at least one processor, the second communication device 450 at least monitors the first-type signaling in the first resource block set in the first time window in the first sub-band; and receives the first signaling in the first resource block; monitors the second-type signaling in the second resource block set in the second time window in the first sub-band; and monitors the third-type signaling in the target resource block set in the third time window in the second sub-band. Herein, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the second communication device 450 comprises a memory that stores computer readable instruction program, the computer readable instruction program generates actions when executed by at least one processor, which include: monitoring the first-type signaling in the first resource block set in the first time window in the first sub-band; and receiving the first signaling in the first resource block; monitoring the second-type signaling in the second resource block set in the second time window in the first sub-band; and monitoring the third-type signaling in the target resource block set in the third time window in the second sub-band. Herein, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first-type signaling in the first resource block set in the first time window in the first sub-band, or, drops transmitting the first-type signaling in the first resource block set in the first time window in the first sub-band; transmits the first signaling in the first resource block; transmits the second-type signaling in the second resource block set in the second time window in the first sub-band, or, drops transmitting the second-type signaling in the second resource block set in the second time window in the first sub-band; transmits the third-type signaling in the target resource block set in the third time window in the second sub-band, or, drops transmitting the third-type signaling in the target resource block set in the third time window in the second sub-band. Herein, the first signaling is used for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the first communication device 410 comprises a memory that stores computer readable instruction program, the computer readable instruction program generates actions when executed by at least one processor, which include: transmitting the first-type signaling in the first resource block set in the first time window in the first sub-band, or, dropping transmitting the first-type signaling in the first resource block set in the first time window in the first sub-band; transmitting the first signaling in the first resource block; transmitting the second-type signaling in the second resource block set in the second time window in the first sub-band, or, dropping transmitting the second-type signaling in the second resource block set in the second time window in the first sub-band; transmitting the third-type signaling in the target resource block set in the third time window in the second sub-band, or, dropping transmitting the third-type signaling in the target resource block set in the third time window in the second sub-band. Herein, the first signaling is used for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, at least one of the antenna 452, the receiver 454, the receiving processor 456, the multi-antenna receiving processor 458, the controller/processor 459, the memory 460 or the data source 467 is used for monitoring the first-type signaling in the first resource block set in the first time window in the first sub-band.

In one embodiment, at least one of the antenna 420, the transmitter 418, the transmitting processor 416, the multi-antenna transmitting processor 471, the controller/processor 475 or the memory 476 is used for transmitting the first-type signaling in the first resource block set in the first time window in the first sub-band.

In one embodiment, at least one of the antenna 452, the receiver 454, the receiving processor 456, the multi-antenna receiving processor 458, the controller/processor 459, the memory 460 or the data source 467 is used for receiving the first signaling in the first resource block; at least one of the antenna 420, the transmitter 418, the transmitting processor 416, the multi-antenna transmitting processor 471, the controller/processor 475 or the memory 476 is used for transmitting the first signaling in the first resource block.

In one embodiment, at least one of the antenna 452, the receiver 454, the receiving processor 456, the multi-antenna receiving processor 458, the controller/processor 459, the memory 460 or the data source 467 is used for monitoring the second-type signaling in the second resource block set in the second time window in the first sub-band.

In one embodiment, at least one of the antenna 420, the transmitter 418, the transmitting processor 416, the multi-antenna transmitting processor 471, the controller/processor 475 or the memory 476 is used for transmitting the second-type signaling in the second resource block set in the second time window in the first sub-band.

In one embodiment, at least one of the antenna 452, the receiver 454, the receiving processor 456, the multi-antenna receiving processor 458, the controller/processor 459, the memory 460 or the data source 467 is used for monitoring the third-type signaling in the target resource block set in the third time window in the second sub-band.

In one embodiment, at least one of the antenna 420, the transmitter 418, the transmitting processor 416, the multi-antenna transmitting processor 471, the controller/processor 475 or the memory 476 is used for transmitting the third-type signaling in the target resource block set in the third time window in the second sub-band.

In one embodiment, at least one of the antenna 452, the receiver 454, the receiving processor 456, the multi-antenna receiving processor 458, the controller/processor 459, the memory 460 or the data source 467 is used for receiving the first information block; at least one of the antenna 420, the transmitter 418, the transmitting processor 416, the multi-antenna transmitting processor 471, the controller/processor 475 or the memory 476 is used for transmitting the first information block.

In one embodiment, at least one of the antenna 452, the receiver/transmitter 454, the receiving processor 456, the transmitting processor 468, the multi-antenna receiving processor 458, the multi-antenna transmitting processor 457 or the controller/processor 459 is used for configuring the first counter's value to be the first time length after detecting the first signaling.

In one embodiment, at least one of the receiver/transmitter 454, the receiving processor 456, the transmitting processor 468 or the controller/processor 459 is used for decrementing the first counter by 1 for each said second-type reference slot passed.

Embodiment 5

Figure 5:
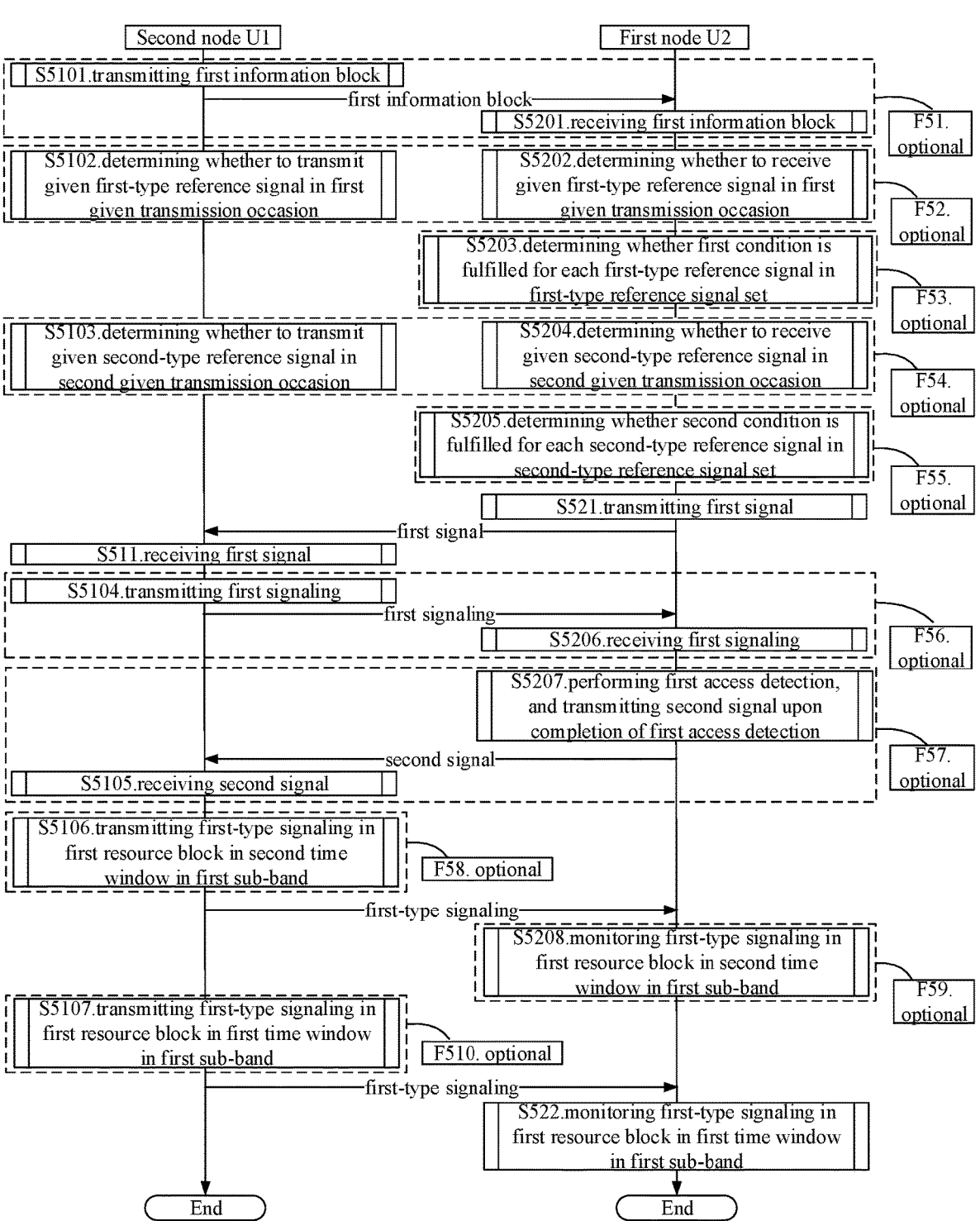
FIG. 5 illustrates a flowchart of wireless transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes in transmission through an air interface. The steps marked by boxes F51-F510 in the figure are optional, respectively.

The second node U1 transmits a first information block in step S5101; determines whether to transmit a given first-type reference signal in a first given transmission occasion in step S5102; and determines whether to transmit a given second-type reference signal in a second given transmission occasion in step S5103; receives a first signal in step S511; transmits a first signaling in step S5104; and receives a second signal in step S5105; transmits a first-type signaling in a first resource block in a second time window in a first sub-band in step S5106; and transmits the first-type signaling in the first resource block in a first time window in the first sub-band in step S5107.

The first node U2 receives a first information block in step S5201; determines whether to receive a given first-type reference signal in a first given transmission occasion in step S5202; and determines whether a first condition is fulfilled for each first-type reference signal in a first-type reference signal set in step S5203; determines whether to receive a given second-type reference signal in a second given transmission occasion in step S5204; and determines whether a second condition is fulfilled for each second-type reference signal in a second-type reference signal set in step S5205; transmits a first signal in step S521; receives a first signaling in step S5206; performs a first access detection, and transmits a second signal after completion of the first access detection in step S5207; monitors a first-type signaling in a first resource block in a second time window in a first sub-band in step S5208; and monitors the first-type signaling in the first resource block in a first time window in the first sub-band in step S522.

In Embodiment 5, the first signal is used by the second node U1 for determining a first reference signal; for the monitoring on the first-type signaling in the first resource block in the first time window, the first node assumes same QCL parameters as a target reference signal; the target reference signal is either the first reference signal or a second reference signal; whether the first time window belongs to a first-type time window is used by the first node U2 for determining the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used by the first node U2 for determining the target reference signal between the first reference signal and the second reference signal.

In one embodiment, the first node U2 is the first node in the present disclosure.

In one embodiment, the second node U1 is the second node in the present disclosure.

In one embodiment, an air interface between the second node U1 and the first node U2 includes a radio interface between a base station and a UE.

In one embodiment, an air interface between the second node U1 and the first node U2 includes a radio interface between UEs.

In one embodiment, the second node U1 is a maintenance base station for a serving cell of the first node U2.

In one embodiment, whether the first time window belongs to a first-type time window is used by the second node U2 for determining the target reference signal between the first reference signal and the second reference signal.

In one embodiment, when the first time window belongs to the target time window, whether the first reference signal is QCLed with a reference signal in the target reference signal group is used by the second node U1 for determining the target reference signal between the first reference signal and the second reference signal.

In one embodiment, the first signal is transmitted on a PRACH.

In one embodiment, the first signal is transmitted on a Physical Uplink Control Channel (PUCCH).

In one embodiment, the first signal is transmitted on a Physical Uplink Shared CHannel (PUSCH).

In one embodiment, the first signal is transmitted on a Physical Sidelink Shared Channel (PSSCH).

In one embodiment, the first-type signaling is transmitted on a PDCCH.

In one embodiment, the first-type signaling is transmitted on a Physical Sidelink Control Channel (PSCCH).

In one embodiment, steps marked by the box F51 in FIG. 5 exist; the first information block is used by the first node for determining the first resource block.

In one embodiment, the first information block is carried by a higher layer signaling.

In one embodiment, the first information block is carried by an RRC signaling.

In one embodiment, the first information block is carried by a MAC CE signaling.

In one embodiment, the first information block is jointly carried by an RRC signaling and a MAC CE.

In one embodiment, the first information block comprises information in all or part of fields of an Information Element (IE).

In one embodiment, the first information block comprises information in all or part of fields of a ControlResourceSet IE.

In one embodiment, the first information block comprises information in all or part of fields of a SearchSpace IE.

In one embodiment, the first information block comprises configuration information of a search space set to which the first resource block belongs.

In one embodiment, the first information block comprises configuration information of a CORESET associated with the first resource block.

In one embodiment, the first information block is transmitted on a Physical Downlink Shared CHannel (PDSCH).

In one embodiment, the first information block is transmitted on a PSSCH.

In one embodiment, steps marked by both the box F52 and the box F53 in FIG. 5 exist; whether each first-type reference signal comprised in the first-type reference signal set fulfills the first condition is used by the first node U2 for determining whether the first signal is transmitted; the given first-type reference signal is any first-type reference signal in the first-type reference signal set, a first transmission occasion set is reserved for the given first-type reference signal, and the first given transmission occasion is a transmission occasion in the first transmission occasion set.

In one embodiment, steps marked by both the box F54 and the box F55 in FIG. 5 exist; a second-type reference signal subset is composed of second-type reference signals comprised in the second-type reference signal set that fulfill the second condition, and the first reference signal is a second-type reference signal in the second-type reference signal subset; a given second-type reference signal is any second-type reference signal comprised in the second-type reference signal set, and a second transmission occasion set is reserved for the given second-type reference signal; the second given transmission occasion is one transmission occasion in the second transmission occasion set.

In one embodiment, steps marked by the box F56 in FIG. 5 exist; the first time window belongs to the target time window; the first signaling is used by the first node U2 for determining the target time window and the target reference signal group.

In one embodiment, the first signaling is transmitted on a PDCCH.

In one embodiment, the first signaling is transmitted on a PSCCH.

In one embodiment, steps marked by the box F57 in FIG. 5 exist; the first time window belongs to the target time window; the second signal is used by the second node U1 for determining the target time window and the target reference signal group.

In one embodiment, the second signal is transmitted on a PUSCH.

In one embodiment, steps marked by both the box F58 and the box F59 in FIG. 5 exist.

In one embodiment, the step marked by the box F58 in FIG. 5 does not exist, and the step marked by the box F59 exists.

In one embodiment, for the monitoring on the first-type signaling in the first resource block in the second time window, the first node assumes same QCL parameters as the second reference signal; an end of the second time window is no later than a start of the first time window.

In one embodiment, the first resource block belongs to a first search space set, and the second time window is a latest monitoring occasion of the first search space set earlier than the first signal.

In one embodiment, the first resource block belongs to a first search space set, and the second time window is a latest monitoring occasion of the first search space set earlier than a first time point; the first time point is a start time of a fourth slot subsequent to a slot to which the first signal belongs.

In one embodiment, neither the step marked by the box F58 nor the step marked by the box F59 in FIG. 5 exists.

In one embodiment, the step marked by the box F510 in FIG. 5 exists.

In one embodiment, the step marked by the box F510 in FIG. 5 does not exist.

In one embodiment, the above method used in the first node for wireless communications comprises:

a physical layer of the first node sends first indication information to a higher layer of the first node;

the physical layer of the first node receives second indication information from a higher layer of the first node;

herein, the first indication information indicates a beam failure instance, and the second indication information triggers transmission of the first signal.

In one embodiment, when and only when the first node determines that each first-type reference signal in the first-type reference signal set fulfills the first condition will the physical layer of the first node send the first indication information to the higher layer of the first node.

In one embodiment, when and only when the first node determines that each first-type reference signal in the first-type reference signal set fulfills the first condition and that at least one second-type reference signal in the second-type reference signal set fulfills the second condition will the physical layer of the first node send the first indication information to the higher layer of the first node; the first reference signal is a second-type reference signal in the second-type reference signal set.

In one embodiment, the second indication information indicates the first reference signal.

In one embodiment, the above method used in the first node for wireless communications comprises:

a higher layer of the first node initializes a first counter as 0;

after receiving a piece of indication information indicating a beam failure instance, the higher layer of the first node starts or restarts a first timer, and increments the first counter by 1;

if the first counter is greater than or equal to a first counter threshold, the higher layer of the first node sends the second indication information to the physical layer of the first node;

if the first counter is expired, the higher layer of the first node clears the first counter.

In one embodiment, the first counter threshold comprises information in a beamFailureInstanceMaxCount field in a RadioLinkMonitoringConfig IE.

In one embodiment, an initial value of the first counter is configured by a higher layer parameter beamFailureDetectionTimer.

In one embodiment, a name of a higher layer signaling for configuring the first timer includes RadioLinkMonitoring.

In one embodiment, the above method used in the first node for wireless communications comprises:

starting a second timer after transmitting the first signal;

stopping the second timer when the current time does not belong to the first-type time window;

recovering the second timer when the current time belongs to the first-type time window;

transmitting a third signal if the first-type signaling is not detected starting from a first time point to the expiration of the second timer; the first time point is a start time of a fourth slot subsequent to a slot to which the first signal belongs.

In one embodiment, an initial value of the second timer is configured by a higher layer parameter beamFailureRecoveryTimer.

In one embodiment, a name of a higher layer signaling for configuring the second timer includes BeamFailureRecovery.

In one embodiment, the third signal comprises a baseband signal.

In one embodiment, the third signal comprises a radio signal.

In one embodiment, the third signal comprises a radio frequency signal.

In one embodiment, the third signal and the first signal carry same information.

In one embodiment, the third signal and the first signal are transmitted on a same BWP.

In one embodiment, the third signal and the first signal are transmitted on different BWPs.

In one embodiment, the third signal comprises a RACH Preamble.

In one embodiment, the third signal comprises a BRR.

In one embodiment, the third signal comprises a BFRQ.

In one embodiment, the third signal and the first signal occupy a same PRACH resource.

In one embodiment, the third signal and the first signal occupy different PRACH resources.

In one embodiment, the above method used in the first node for wireless communications comprises:

receiving a second signaling in a second resource block;

herein, the second resource block is a search space set, and the second resource block is identified by a recoverySearchSpaceId; the first time window is later than the second signaling.

In one embodiment, a time interval between a start of the first time window and a last multicarrier symbol occupied by the second signaling is no smaller than Q1 multicarrier symbols, Q1 being a positive integer greater than 1.

In one subembodiment, Q1 is equal to 28.

In one subembodiment, Q1 is equal to 27.

In one embodiment, the second signaling comprises DCI with CRC scrambled by a C-RNTI or an MCS-C-RNTI.

In one embodiment, the second signaling is transmitted on the first sub-band.

In one embodiment, the second signaling is transmitted on a sub-band other than the first sub-band.

In one embodiment, the second signaling and the first sub-band belong to a same serving cell.

Embodiment 6

Figures 6, 7, 8, 9, 10:
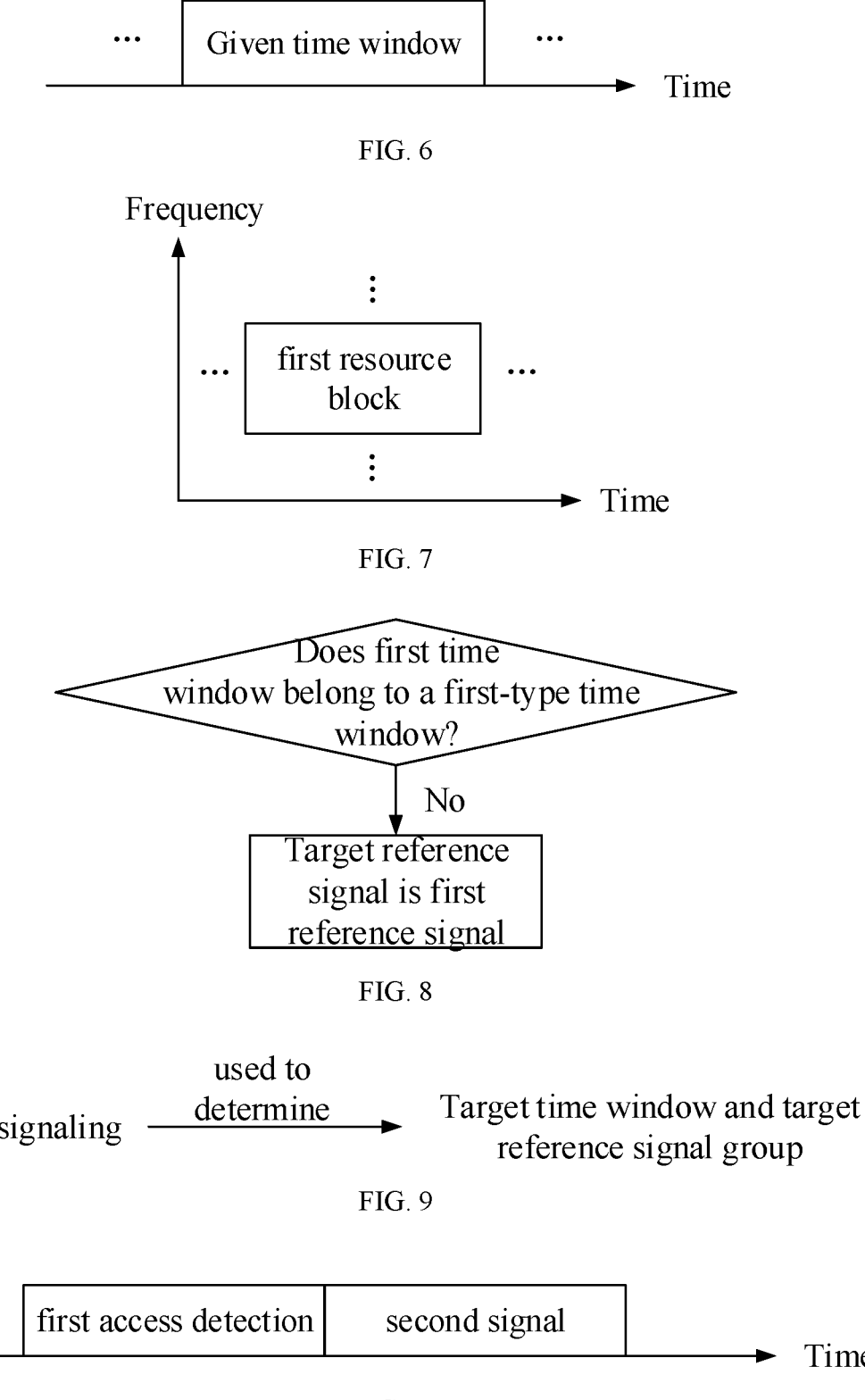
FIG. 6 illustrates a schematic diagram of a given time window according to one embodiment of the present disclosure.
FIG. 7 illustrates a schematic diagram of a first resource block according to one embodiment of the present disclosure.
FIG. 8 illustrates a schematic diagram of whether a first time window belongs to a first-type time window being used to determine a target reference signal according to one embodiment of the present disclosure.
FIG. 9 illustrates a schematic diagram of a first signaling being used to determine a target time window and a target reference signal group according to one embodiment of the present disclosure.
FIG. 10 illustrates a schematic diagram of a first access detection and a second signal according to one embodiment of the present disclosure.

Embodiment 6 illustrates a schematic diagram of a given time window according to one embodiment of the present disclosure; as shown in FIG. 6. In Embodiment 6, the given time window is one of the first time window, the target time window, any said first-type time window or the second time window.

In one embodiment, the given time window is the first time window.

In one embodiment, the given time window is the target time window.

In one embodiment, the given time window is any said first-type time window.

In one embodiment, the given time window is the second time window.

In one embodiment, the given time window is a contiguous time duration.

In one embodiment, the given time window comprises a positive integer number of multicarrier symbol(s).

In one embodiment, the given time window comprises a positive integer number of consecutive multicarrier symbols.

In one embodiment, the given time window comprises a positive integer number of slot(s).

In one embodiment, the given time window is of a length no greater than 10000 ms.

In one embodiment, the given time window is of a length no greater than 10 ms.

In one embodiment, the first time window is a slot.

In one embodiment, the first time window is a monitoring occasion of a search space set to which the first resource block belongs.

In one embodiment, the second time window is a monitoring occasion of a search space set to which the first resource block belongs.

In one embodiment, the first time window is a monitoring occasion of the first resource block.

In one embodiment, any said first-type time window comprises a Channel occupancy duration.

In one embodiment, any said first-type time window comprises a Channel occupancy duration occupied by a transmitter of the first-type signaling.

In one embodiment, there is one said first-type time window comprising a Channel occupancy duration occupied by a transmitter of the first-type signaling.

In one embodiment, any said first-type time window comprises a Channel occupancy duration occupied by the first node.

In one embodiment, there is one said first-type time window comprising a Channel occupancy duration occupied by the first node.

In one embodiment, any said first-type time window comprises a Channel occupancy duration occupied by a transmitter of the first-type signaling or the first node.

In one embodiment, any said first-type time window belongs to a Channel occupancy duration.

In one embodiment, any said first-type time window belongs to a Channel occupancy duration occupied by a transmitter of the first-type signaling.

In one embodiment, there is one said first-type time window belonging to a Channel occupancy duration occupied by a transmitter of the first-type signaling.

In one embodiment, any said first-type time window belongs to a Channel occupancy duration occupied by the first node.

In one embodiment, there is one said first-type time window belonging to a Channel occupancy duration occupied by the first node.

In one embodiment, any said first-type time window belongs to a Channel occupancy duration occupied by a transmitter of the first-type signaling or the first node.

In one embodiment, a transmitter of the first-type signaling can occupy the first sub-band in any said first-type time window.

In one embodiment, a transmitter of the first-type signaling occupies the first sub-band in any said first-type time window.

In one embodiment, a transmitter of the first-type signaling considers that the first sub-band is idle in any said first-type time window.

In one embodiment, a transmitter of the first-type signaling transmits a radio signal to the first node in any said first-type time window.

In one embodiment, a transmitter of the first-type signaling transmits a radio signal to the first node on a first serving cell in any said first-type time window, the first sub-band belonging to the first serving cell.

In one embodiment, a transmitter of the first-type signaling occupies a first serving cell in any said first-type time window, the first sub-band belonging to the first serving cell.

In one embodiment, a transmitter of the first-type signaling transmits a radio signal to the first node on a serving cell comprised in a first serving cell group in any said first-type time window; the serving cell to which the first sub-band belongs is a part of the first serving cell group.

In one embodiment, a transmitter of the first-type signaling occupies all serving cells comprised in a first serving cell group in any said first-type time window; the serving cell to which the first sub-band belongs is a part of the first serving cell group.

In one embodiment, the first serving cell group comprises more than one serving cell.

In one embodiment, any serving cell in the first serving cell group is added by the first node.

In one embodiment, the first serving cell group is configured by a higher layer parameter.

In one embodiment, a name of a higher layer parameter used for configuring the first serving cell group includes searchSpaceSwitching.

In one embodiment, a higher layer parameter used for configuring the first serving cell group comprises information in a searchSpaceSwitchingGroupList-r16 field in a PDCCH-Config IE.

In one embodiment, the handovers of all serving cells comprised in the first serving cell group between a search space set group 0 and a search space set group 1 are performed simultaneously.

Embodiment 7

Embodiment 7 illustrates a schematic diagram of a first resource block according to one embodiment of the present disclosure; as shown in FIG. 7.

In one embodiment, the first resource block occupies a positive integer number of RE(s) in time-frequency domain.

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first resource block occupies a positive integer number of multicarrier symbol(s) in time domain.

In one embodiment, the first resource block occupies a positive integer number of RB(s) in frequency domain.

In one embodiment, the first resource block comprises a search space set.

In one embodiment, the first resource block is a search space set.

In one embodiment, the first resource block comprises a part of a search space set that occurs in a monitoring occasion.

In one embodiment, the first resource block is a part of a search space set that occurs in a monitoring occasion.

In one embodiment, the first resource block comprises a part of a search space set in the first time window.

In one embodiment, the first resource block comprises one or more PDCCH candidates.

In one embodiment, the first resource block comprises all or part of PDCCH candidates in a search space set.

In one embodiment, the first resource block comprises a CORESET.

In one embodiment, the first resource block comprises a part of a CORESET in the first time window.

In one embodiment, the first resource block occurs periodically in time domain.

In one embodiment, the first resource block occurs multiple times in time domain.

In one embodiment, the first resource block occurs only once in time domain.

In one embodiment, an index of a CORESET associated with the first resource block is equal to 0.

In one embodiment, an index of a CORESET associated with the first resource block is not equal to 0.

In one embodiment, a search space set to which the first resource block belongs is identified by a recoverySearchSpaceId.

In one embodiment, a search space set to which the first resource block belongs comprises a Common search space (CSS).

In one embodiment, a search space set to which the first resource block belongs is a Type0-PDCCH CSS.

In one embodiment, a search space set to which the first resource block belongs comprises a UE-specific search space (USS).

In one embodiment, a search space set to which the first resource block belongs is not configured with a higher layer parameter searchSpaceGroupIdList-r16.

Embodiment 8

Embodiment 8 illustrates a schematic diagram of whether a first time window belongs to a first-type time window being used to determine a target reference signal according to one embodiment of the present disclosure; as shown in FIG. 8. In Embodiment 8, when the first time window does not belong to any said first-type time window, the target reference signal is the first reference signal.

In one embodiment, if the first time window does not belong to any said first-type time window, the target reference signal is the first reference signal.

In one embodiment, when the first time window belongs to the target time window of the first-type time windows, whether the first reference signal is QCLed with a reference signal in the target reference signal group is used for determining the target reference signal between the first reference signal and the second reference signal.

In one embodiment, if the first time window belongs to the target time window of the first-type time windows, whether the first reference signal is QCLed with a reference signal in the target reference signal group is used for determining the target reference signal between the first reference signal and the second reference signal.

In one embodiment, if the first time window belongs to the target time window of the first-type time windows, whether the first reference signal is QCLed with a reference signal in the target reference signal group, corresponding to a QCL-TypeD is used for determining the target reference signal between the first reference signal and the second reference signal.

In one embodiment, if the first time window belongs to the target time window and the first reference signal is QCLed with a reference signal in the target reference signal group, the target reference signal is the first reference signal.

In one embodiment, if the first time window belongs to the target time window and the first reference signal is QCLed with a reference signal in the target reference signal group, corresponding to QCL-TypeD, the target reference signal is the first reference signal.

In one embodiment, if the first time window belongs to the target time window of the first-type time windows and the first reference signal is not QCL with any reference signal in the target reference signal group, the target reference signal is the second reference signal.

In one embodiment, if the first time window belongs to the target time window of the first-type time windows and the first reference signal is not QCL-TypeD with any reference signal in the target reference signal group, the target reference signal is the second reference signal.

In one embodiment, if the first time window belongs to the target time window, and the first reference signal is QCLed with a reference signal in the target reference signal group, and the second reference signal is also QCL with a reference signal in the target reference signal group, the target reference signal is the first reference signal.

In one embodiment, if the first time window belongs to the target time window, when and only when at least one of the first reference signal or the second reference signal is QCLed with a reference signal in the target reference signal group will the first node monitor the first-type signaling in the first resource block in the first time window in the first sub-band.

In one embodiment, if the first time window belongs to the target time window, when and only when at least one of the first reference signal or the second reference signal is QCL-TypeD with a reference signal in the target reference signal group will the first node monitor the first-type signaling in the first resource block in the first time window in the first sub-band.

In one embodiment, if the first time window belongs to the target time window, and the first reference signal is not QCL with any reference signal in the target reference signal group, and the second reference signal is not QCL with any reference signal in the target reference signal group, the first node drops monitoring the first-type signaling in the first resource block in the first time window in the first sub-band.

In one embodiment, if the first time window belongs to the target time window, and the first reference signal is not QCL-TypeD with any reference signal in the target reference signal group, and the second reference signal is not QCL-TypeD with any reference signal in the target reference signal group, the first node drops monitoring the first-type signaling in the first resource block in the first time window in the first sub-band.

Embodiment 9

Embodiment 9 illustrates a schematic diagram of a first signaling being used to determine a target time window and a target reference signal group according to one embodiment of the present disclosure; as shown in FIG. 9.

In one embodiment, the first signaling is the first-type signaling.

In one embodiment, the first signaling is not the first-type signaling.

In one embodiment, the first signaling comprises a physical layer signaling.

In one embodiment, the first signaling comprises a dynamic signaling.

In one embodiment, the first signaling comprises an L1 signaling.

In one embodiment, the first signaling comprises DCI.

In one embodiment, the first signaling comprises one or more fields of a piece of DCI.

In one embodiment, the first signaling comprises one or more fields of a piece of SCI.

In one embodiment, the first signaling comprises an RRC signaling.

In one embodiment, a format of the first signaling is DCI Format 2_0.

In one embodiment, a format of the first signaling is one of DCI Format 0_0, DCI Format 0_1, DCI Format 0_2, DCI Format 1_0, DCI Format 1_1, DCI Format 1_2, DCI Format 2_0, DCI Format 2_1, DCI Format 2_2, DCI Format 2_3, DCI Format 2_4, DCI Format 2_5 or DCI Format 2_6.

In one embodiment, a time-frequency resource occupied by the first signaling and the first resource block belong to a same search space set.

In one embodiment, a time-frequency resource occupied by the first signaling and the first resource block belong to different search space sets.

In one embodiment, the first signaling is transmitted on Licensed Spectrum.

In one embodiment, the first signaling is transmitted on Unlicensed Spectrum.

In one embodiment, the first signaling belongs to the first sub-band in frequency domain.

In one embodiment, the first signaling and the first sub-band belong to a same serving cell.

In one embodiment, the first signaling does not belong to the first sub-band in frequency domain.

In one embodiment, the first signaling and the first sub-band belong to different serving cells.

In one embodiment, a serving cell to which the first signaling belongs and a serving cell to which the first sub-band belongs are both parts of a first serving cell group.

In one embodiment, a time-domain resource occupied by the first signaling is earlier than the target time window.

In one embodiment, the first signaling comprises a first bit string, the first bit string indicating the target time window.

In one embodiment, the first bit string indicates a start and a length of the target time window.

In one embodiment, the first bit string indicates a channel occupancy duration.

In one embodiment, the first bit string indicates a Slot Format Indicator (SFI).

In one embodiment, a time-domain resource occupied by the first signaling is used to determine a start of the target time window.

In one embodiment, a start of the target time window is an end time for a time unit occupied by the first signaling.

In one embodiment, a start of the target time window is a start time of an earliest time unit following at least P1 symbols after a last multicarrier symbol occupied by the first signaling, P1 being a positive integer greater than 1.

In one embodiment, upon reception of the first signaling, the first node starts a third timer, and a time of expiration of the third timer is used to determine an end of the target time window.

In one subembodiment, an initial value of the third timer is configured by a higher layer signaling.

In one subembodiment, an initial value of the third timer is configured by a higher layer parameter of searchSpaceSwitchingTimer-r16.

In one subembodiment, the end of the target time window is the time of expiration of the third timer.

In one subembodiment, the end of the target time window is a start time of an earliest time unit following at least P1 symbols after the time unit of expiration of the third timer, P1 being a positive integer greater than 1.

In one embodiment, the time unit is a slot.

In one embodiment, the time unit is a sub-slot.

In one embodiment, the time unit comprises a positive integer number of (more than one) consecutive multicarrier symbols.

In one embodiment, the number of multicarrier symbols comprised by the time unit is configured by a higher layer signaling.

In one embodiment, the first signaling indicates the target reference signal group.

In one embodiment, the first signaling comprises a bit field, the bit field indicating each reference signal in the target reference signal group.

In one embodiment, a DMRS antenna port of the first signaling is used to determine the target reference signal group.

In one embodiment, any reference signal in the target reference signal group and a DMRS antenna port of the first signaling are QCL.

In one embodiment, any reference signal in the target reference signal group and a DMRS antenna port of the first signaling are QCL, corresponding to QCL-TypeD.

In one embodiment, a time-frequency resource occupied by the first signaling is used to determine the target reference signal group.

In one embodiment, a Transmission Configuration Indicator (TCI) state corresponding to a CORESET to which the first signaling belongs indicates a fourth reference signal; any reference signal in the target reference signal group is QCLed with the fourth reference signal.

In one subembodiment, any reference signal in the target reference signal group is QCLed with the fourth reference signal, corresponding to QCL-TypeD.

In one embodiment, the first signaling is earlier than the first time window in time domain.

In one embodiment, the first signaling is later than the first time window in time domain.

In one embodiment, the first signaling and the first time window are overlapping in time domain.

Embodiment 10

Embodiment 10 illustrates a schematic diagram of a first access detection and a second signal according to one embodiment of the present disclosure; as shown in FIG. 10. In Embodiment 10, the first node transmits the second signal after completion of the first access detection.

In one embodiment, the first access detection is Listen Before Talk (LBT).

In one embodiment, the first access detection is Category 4 LBT.

In one embodiment, the first access detection is Category 2 LBT.

In one embodiment, the specific way of implementation of LBT can be found in 3GPP TR36.889.

In one embodiment, the first access detection is Clear Channel Assessment (CCA).

In one embodiment, the specific way of implementation of CCA can be found in 3GPP TR36.889.

In one embodiment, the first access detection is implemented in a way defined by 3GPP TS37.213, section 4.

In one embodiment, the first access detection is a UL Channel access procedure.

In one embodiment, the specific way of implementation of UL Channel access procedure can be found in 3GPP TS37.213, section 4.2.

In one embodiment, the first access detection is a Type 1 UL Channel access procedure.

In one embodiment, the first access detection is a Type 2 UL Channel access procedure.

In one embodiment, the first access detection is performed on the first sub-band.

In one embodiment, the first access detection is performed on a second sub-band, the second sub-band comprising the first sub-band.

In one embodiment, the first access detection is performed on a first serving cell, the first sub-band belonging to the first serving cell.

In one embodiment, the first access detection is used by the first node for determining that the first sub-band is idle.

In one embodiment, the first node determines that the first sub-band is idle at an end time of the first access detection.

In one embodiment, the first access detection is used to determine that the first sub-band can be occupied by the first node in the target time window.

In one embodiment, the first access detection is used to determine that the first sub-band can be occupied by a transmitter of the first-type signaling in the target time window.

In one embodiment, the first access detection is used to determine whether the second signal can be transmitted.

In one embodiment, the first access detection is used to determine that the second signal can be transmitted.

In one embodiment, the first node determines a success of LBT at the end time of the first access detection.

In one embodiment, the end time of the first access detection is used to determine a start of the target time window.

In one embodiment, the end time of the first access detection is a start of the target time window.

In one embodiment, a length of the target time window is fixed.

In one embodiment, the first node transmits the second signal immediately after completion of the first access detection.

In one embodiment, the second signal comprises a baseband signal.

In one embodiment, the second signal comprises a radio signal.

In one embodiment, the second signal comprises a radio frequency signal.

In one embodiment, the second signal is an uplink transmission based on configured grant.

In one embodiment, the second signal is an uplink transmission based on dynamic grant.

In one embodiment, an end time of the second signal is a start of the target time window.

In one embodiment, the second signal indicates the target time window.

In one embodiment, the second signal indicates a time interval between a start of the target time window and a time unit occupied by the second signal.

In one embodiment, the second signal indicates a length of the target time window.

In one embodiment, the second signal comprises Configured Grant (CG)-UCI.

In one embodiment, the second signal comprises a first field, and the first field comprised by the second signal indicates the target time window; the first field comprises all or part of information in a Channel Occupancy Time (COT) sharing information field.

In one embodiment, the second signal comprises a second field, and the second field in the second signal indicates the target reference signal group.

In one embodiment, the first node uses a same spatial filter to perform the first access detection and receive the target reference signal group.

In one embodiment, the first node uses a same spatial filter to perform the first access detection and transmit the target reference signal group.

In one embodiment, the first node uses a same spatial filter to transmit the second signal and receive the target reference signal group.

In one embodiment, the first node uses a same spatial filter to transmit the second signal and the target reference signal group.

In one embodiment, the target reference signal group and a DMRS antenna port of the second signal are QCL.

In one embodiment, the target reference signal group and a DMRS antenna port of the second signal are QCL, corresponding to QCL-TypeD.

In one embodiment, the second signal is earlier than the first time window in time domain.

In one embodiment, the second signal is later than the first time window in time domain.

In one embodiment, the second signal and the first time window are overlapping in time domain.

Embodiment 11

Embodiment 11 illustrates a schematic diagram of determining whether a given first-type reference signal fulfills a first condition according to one embodiment of the present disclosure; as shown in FIG. 11. In Embodiment 11, when the given first-type reference signal fulfills either of a first condition subset and a second condition subset, the given first-type reference signal fulfills the first condition; the first condition subset comprises: a number of transmission occasions comprised by the first occasion subset is greater than the first threshold; the second condition subset comprises: the first received quality is lower than the second threshold; the first node drops receiving the given first-type reference signal in the first occasion subset but receives the given first-type reference signal in the second occasion subset; a measurement on the given first-type reference signal in the second occasion subset is used to determine the first received quality, the first occasion subset and the second occasion subset both being subsets of the first transmission occasion.

In one embodiment, if the given first-type reference signal fulfills one of the first condition subset and the second condition subset, the given first-type reference signal fulfills the first condition.

In one embodiment, if the given first-type reference signal fulfills the first condition subset, the given first-type reference signal fulfills the first condition.

In one embodiment, if the given first-type reference signal fulfills the second condition subset, the given first-type reference signal fulfills the first condition.

In one embodiment, when the given first-type reference signal fulfills neither the first condition subset nor the second condition subset, the given first-type reference signal does not fulfill the first condition.

In one embodiment, if the given first-type reference signal fulfills neither the first condition subset nor the second condition subset, the given first-type reference signal does not fulfill the first condition.

In one embodiment, the first-type reference signal set comprises one or more first-type reference signals.

In one embodiment, any first-type reference signal in the first-type reference signal set is a CSI-RS or an SSB.

In one embodiment, the first-type reference signal set is configured by a higher-layer parameter of failureDetectionResources or a higher-layer parameter of failureDetectionResourcesToAddModList.

In one embodiment, the first-type reference signal set is configured by a higher-layer signaling.

In one embodiment, a higher-layer signaling for configuring the first-type reference signal set comprises information in all or part of fields of a RadioLinkMonitoring IE.

In one embodiment, a higher-layer signaling for configuring the first-type reference signal set comprises information in all or part of fields of a ControlResourceSet IE.

In one embodiment, the first-type reference signal set only comprises one first-type reference signal, the first-type reference signal being the given first-type reference signal.

In one embodiment, the first-type reference signal set comprises more than one first-type reference signal, and the given first-type reference signal is any first-type reference signal in the first-type reference signal set.

In one embodiment, any first-type reference signal in the first-type reference signal set occurs periodically in time domain.

In one embodiment, any first-type reference signal in the first-type reference signal set occurs multiple times in time domain.

In one embodiment, any first-type reference signal in the first-type reference signal set is transmitted on the first sub-band.

In one embodiment, a first-type reference signal in the first-type reference signal set is transmitted on a sub-band different from the first sub-band.

In one embodiment, any first-type reference signal in the first-type reference signal set is transmitted on Unlicensed Spectrum.

In one embodiment, any two first-type reference signals in the first-type reference signal set are not QCLed.

In one embodiment, any two first-type reference signals in the first-type reference signal set are not QCLed, let alone corresponding to QCL-TypeD.

In one embodiment, the given transmission occasion set comprises one transmission occasion.

In one embodiment, the given transmission occasion set comprises a positive integer number of (more than one) transmission occasions.

In one embodiment, any transmission occasion in the given transmission occasion set is a contiguous duration.

In one embodiment, any transmission occasion in the given transmission occasion set comprises a positive integer number of multicarrier symbol(s).

In one embodiment, any two transmission occasions in the given transmission occasion set are mutually orthogonal in time domain.

In one embodiment, each transmission occasion in the given transmission occasion set occurs periodically in time domain.

In one embodiment, each transmission occasion in the given transmission occasion set occurs at equal intervals in time domain.

In one embodiment, each transmission occasion in the given transmission occasion set occurs at unequal intervals in time domain.

In one embodiment, the given transmission occasion set is the first transmission occasion set or the second transmission occasion set.

In one embodiment, the given transmission occasion set is the first transmission occasion set.

In one embodiment, the given transmission occasion set is the second transmission occasion set.

In one embodiment, the first occasion subset comprises all or part of transmission occasions in the first transmission occasion set.

In one embodiment, any transmission occasion comprised by the first occasion subset belongs to the first transmission occasion set.

In one embodiment, the second occasion subset comprises all or part of transmission occasions in the first transmission occasion set.

In one embodiment, any transmission occasion comprised by the second occasion subset belongs to the first transmission occasion set.

In one embodiment, there isn't any transmission occasion comprised by the first transmission occasion set that belongs to both the first occasion subset and the second occasion subset.

In one embodiment, the first occasion subset is empty.

In one embodiment, the number of transmission occasions comprised by the first occasion subset is greater than 0.

In one embodiment, the second occasion subset is empty.

In one embodiment, the number of transmission occasions comprised by the second occasion subset is greater than 0.

In one embodiment, all transmission occasions comprised by the first transmission occasion set belong to a first time interval in time domain.

In one embodiment, each transmission occasion comprised by the second occasion subset belongs to a first time interval in time domain.

In one embodiment, the first time interval is a contiguous duration.

In one embodiment, a length of the first time interval is $T_{Evaluate\_BFD\_SSB}$ ms or $T_{Evaluate\_BFD\_CSI-RS}$ ms.

In one embodiment, specific definitions of the $T_{Evaluate\_BFD\_SSB}$ and $T_{Evaluate\_BFD\_CSI-RS}$ can be found in 3GPP TS38.133.

In one embodiment, the first threshold is a positive integer greater than 1.

In one embodiment, the first threshold is fixed.

In one embodiment, the first threshold is in no need of configuration.

In one embodiment, the first threshold is configured by a higher layer signaling.

In one embodiment, a Reference Signal Received Power (RSRP) of the given first-type reference signal received in the second occasion subset is used to determine the first received quality.

In one embodiment, the first received quality is equal to an RSRP of the given first-type reference signal received in the second occasion subset.

In one embodiment, a Signal-to-noise and interference ratio (SINR) of the given first-type reference signal received in the second occasion subset is used to determine the first received quality.

In one embodiment, the first received quality is equal to a SINR of the given first-type reference signal received in the second occasion subset.

In one embodiment, the first received quality is obtained by either the RSRP or SINR of the given first-type reference signal received in the second occasion subset based on the look-up table method.

In one embodiment, the first received quality is a RSRP.

In one embodiment, the first received quality is a L1-RSRP.

In one embodiment, the first received quality is a SINR.

In one embodiment, the first received quality is a L1-SINR.

In one embodiment, the first received quality is a Reference Signal Received Quality (RSRQ).

In one embodiment, the first received quality is a Signal-to-Noise Ratio (SNR).

In one embodiment, the first received quality is a BLock Error Rate (BLER).

In one embodiment, the second threshold is a real number.

In one embodiment, the second threshold is a non-negative real number.

In one embodiment, the second threshold is a non-negative real number no greater than 1.

In one embodiment, the second threshold is $Q_{out\_LR}$.

In one embodiment, the second threshold is $Q_{out\_LR\_SSB}$ or $Q_{out\_LR\_CSI-RS}$.

In one embodiment, specific definitions of the $Q_{out\_LR}$, $Q_{out\_LR\_SSB}$ and $Q_{out\_LR\_CSI-RS}$ can be found in 3GPP TS38.133.

In one embodiment, the second threshold is determined by a higher layer parameter of rlmInSyncOutOfSyncThreshold.

In one embodiment, the phrase that a first received quality is lower than a second threshold includes a meaning that the first received quality is one of RSRP, SINR, RSRQ or SNR, and the first received quality is smaller than the second threshold.

In one embodiment, the phrase that a first received quality is lower than a second threshold includes a meaning that the first received quality is BLER, and the first received quality is greater than the second threshold.

In one embodiment, the above-mentioned method in a first node used for wireless communications comprises at least one of:

dropping reception of the given first-type reference signal in the first occasion subset; or receiving the given first-type reference signal in the second occasion subset.

In one embodiment, the above-mentioned method in a second node used for wireless communications comprises at least one of:

dropping transmission of the given first-type reference signal in the first occasion subset; or transmitting the given first-type reference signal in the second occasion subset.

Embodiment 12

Embodiment 12 illustrates a schematic diagram of determining whether a given second-type reference signal fulfills a second condition according to one embodiment of the present disclosure; as shown in FIG. 12. In Embodiment 12, when the given second-type reference signal fulfills both the third condition subset and the fourth condition subset, the given second-type reference signal fulfills the second condition; the third condition subset comprises: a number of transmission occasions comprised by the third occasion subset is greater than the third threshold; the fourth condition subset comprises: the second channel quality is greater than or equal to the fourth threshold; the first node receives the given second-type reference signal in the third occasion subset, the third occasion subset being a subset of the second transmission occasion set; a measurement on the given second-type reference signal in the third occasion subset is used to determine the second channel quality.

In one embodiment, if the given second-type reference signal fulfills both the third condition subset and the fourth condition subset, the given second-type reference signal fulfills the second condition.

In one embodiment, when the given second-type reference signal does not fulfill either of the third condition subset and the fourth condition subset, the given second-type reference signal does not fulfill the second condition.

In one embodiment, if the given second-type reference signal does not fulfill either of the third condition subset and the fourth condition subset, the given second-type reference signal does not fulfill the second condition.

In one embodiment, if the given second-type reference signal does not fulfill the third condition subset, the given second-type reference signal does not fulfill the second condition.

In one embodiment, if the given second-type reference signal does not fulfill the fourth condition subset, the given second-type reference signal does not fulfill the second condition.

In one embodiment, the second-type reference signal set comprises one or more second-type reference signals.

In one embodiment, any second-type reference signal in the second-type reference signal set is a CSI-RS or an SSB.

In one embodiment, the second-type reference signal set is configured by a higher layer signaling.

In one embodiment, the second-type reference signal set is configured by a higher layer parameter of candidate-BeamRSList or candidateBeamRSListExt-r16.

In one embodiment, a higher layer signaling for configuring the second-type reference signal set comprises information in all or part of fields of a BeamFailureRecovery-Config IE.

In one embodiment, the second-type reference signal set only comprises one second-type reference signal, the second-type reference signal being the given second-type reference signal.

In one embodiment, the second-type reference signal set comprises more than one second-type reference signal, and the given second-type reference signal is any second-type reference signal in the second-type reference signal set.

In one embodiment, any second-type reference signal in the second-type reference signal set occurs periodically in time domain.

In one embodiment, any second-type reference signal in the second-type reference signal set occurs multiple times in time domain.

In one embodiment, any second-type reference signal in the second-type reference signal set is transmitted on the first sub-band.

In one embodiment, a second-type reference signal in the second-type reference signal set is transmitted on a sub-band different from the first sub-band.

In one embodiment, any second-type reference signal in the second-type reference signal set is transmitted on Unlicensed Spectrum.

In one embodiment, any two second-type reference signals in the second-type reference signal set are not QCLed.

In one embodiment, any two second-type reference signals in the second-type reference signal set are not QCLed, let alone corresponding to QCL-TypeD.

In one embodiment, the third occasion subset comprises all or part of transmission occasions in the second transmission occasion set.

In one embodiment, any transmission occasion comprised by the third occasion subset belongs to the second transmission occasion set.

In one embodiment, the second-type reference signal subset is composed of all second-type reference signals that fulfill the second condition in the second-type reference signal set.

In one embodiment, the second-type reference signal subset only comprises the first reference signal.

In one embodiment, the second-type reference signal subset comprises at least one second-type reference signal in the second-type reference signal set other than the first reference signal.

In one embodiment, the third occasion subset is empty.

In one embodiment, a number of transmission occasion(s) comprised by the third occasion subset is greater than 0.

In one embodiment, all transmission occasions in the second transmission occasion set belong to a second time interval in time domain.

In one embodiment, each transmission occasion in the third occasion subset belongs to a second time interval in time domain.

In one embodiment, the second time interval is a contiguous duration.

In one embodiment, a length of the second time interval is $T_{Evaluate\_CBD\_SSB}$ ms or $T_{Evaluate\_CBD\_CSI-RS}$ ms.

In one embodiment, specific definitions of the $T_{Evaluate\_CBD\_SSB}$ or $T_{Evaluate\_CBD\_CSI-RS}$ can be found in 3GPP TS38.133.

In one embodiment, the third threshold is a positive integer greater than 1.

In one embodiment, the third threshold is fixed.

In one embodiment, the third threshold is in no need of configuration.

In one embodiment, the third threshold is configured by a higher layer signaling.

In one embodiment, the fourth threshold is a real number.

In one embodiment, the fourth threshold is a non-negative real number.

In one embodiment, the fourth threshold is a non-negative real number no greater than 1.

In one embodiment, the fourth threshold is $Q_{in\_LR}$.

In one embodiment, the specific definition of $Q_{in\_LR}$ can be found in 3GPP TS38.133.

In one embodiment, the fourth threshold is configured by a higher layer parameter rsrp-ThresholdSSB.

In one embodiment, the second received quality is a RSRP.

In one embodiment, the second received quality is a L1-RSRP.

In one embodiment, the second received quality is a SINR.

In one embodiment, the second received quality is a L1-SINR.

In one embodiment, the second received quality is a RSRQ.

In one embodiment, the second received quality is a SNR.

In one embodiment, a RSRP of the given second-type reference signal received in the third occasion subset is used to determine the second received quality.

In one embodiment, the second received quality is equal to a RSRP of the given second-type reference signal received in the third occasion subset.

In one embodiment, a SINR of the given second-type reference signal received in the third occasion subset is used to determine the second received quality.

In one embodiment, the second received quality is equal to a SINR of the given second-type reference signal received in the third occasion subset.

In one embodiment, the second received quality is obtained by either the RSRP or SINR of the given second-type reference signal received in the third occasion subset based on the look-up table method.

In one embodiment, the above-mentioned method in a first node used for wireless communications comprises at least one of:

upon reception of a request sent from a higher layer of the first node, a physical layer of the first node reports a second information block to the higher layer, wherein the second information block comprises a first index and the second received quality; the first index is used for identifying the first reference signal.

In one embodiment, the second information block comprises the number of transmission occasion(s) in the third occasion subset.

In one embodiment, a total number of second-type reference signals comprised by the second-type reference signal subset is greater than 1, and the second information block comprises S1 indexes and S1 received qualities, with the second received quality included; the S1 indexes are respectively used for identifying S1 second-type reference signals in the second-type reference signal subset, the first reference signal is one of the S1 second-type reference signals; and the S1 received qualities are received qualities of the S1 second-type reference signals, respectively.

In one subembodiment, the second information block comprises a number of times of each of the S1 second-type reference signals being received in the second time interval.

In one subembodiment, the higher layer of the first node autonomously determines the first reference signal from the S1 second-type reference signals and notifies the physical layer of the first node of the first reference signal via the second indication information.

In one embodiment, the above-mentioned method in a first node used for wireless communications comprises at least one of:

receiving the given second-type reference signal in the third occasion subset; or dropping reception of the given second-type reference signal in a transmission occasion in the second transmission occasion set other than the third occasion subset.

In one embodiment, the above-mentioned method in a second node used for wireless communications comprises at least one of:

transmitting the given second-type reference signal in the third occasion subset; or dropping transmission of the given second-type reference signal in a transmission occasion in the second transmission occasion set other than the third occasion subset.

Embodiment 13

Embodiment 13 illustrates a schematic diagram of a first node determining whether to receive a given reference signal in a given transmission occasion according to one embodiment of the present disclosure; as shown in FIG. 13. In Embodiment 13, the given transmission occasion and the given reference signal are respectively the first given transmission occasion and the given first-type reference signal; or, the given transmission occasion and the given reference signal are respectively the second given transmission occasion and the given second-type reference signal.

In one embodiment, the given transmission occasion is the first given transmission occasion, and the given reference signal is the given first-type reference signal.

In one embodiment, the given transmission occasion is the second given transmission occasion, and the given reference signal is the given second-type reference signal.

In one embodiment, the first given transmission occasion is any transmission occasion in the first transmission occasion set.

In one embodiment, the second given transmission occasion is any transmission occasion in the second transmission occasion set.

In one embodiment, the second given transmission occasion is earlier than the first given transmission occasion in time domain.

In one embodiment, the second given transmission occasion is later than the first given transmission occasion in time domain.

In one embodiment, the second given transmission occasion is overlapping with the first given transmission occasion in time domain.

In one embodiment, the above method in the first node used for wireless communications includes:

performing blind detection on the given reference signal in the given transmission occasion;

herein, a result of the blind detection is used to determine whether to receive the given reference signal in the given transmission occasion.

In one embodiment, the blind detection refers to reception based on coherent detection, namely, performing coherent reception and measuring energy of a signal obtained by the coherent reception; if the energy of the signal obtained by the coherent reception is greater than a third given threshold, it is then determined that the given reference signal is received in the given transmission occasion; otherwise, it is determined that the reception of the given reference signal is dropped in the given transmission occasion.

In one embodiment, the blind detection refers to reception based on energy detection, namely, sensing energy of radio signals and averaging to acquire a received energy; if the received energy is greater than a fourth given threshold, it is then determined that the given reference signal is received in the given transmission occasion; otherwise, it is determined that the reception of the given reference signal is dropped in the given transmission occasion.

In one embodiment, the blind detection means that the first node is not certain about whether to receive the given reference signal in the given transmission occasion before performing the coherent detection.

In one embodiment, the blind detection means that the first node is not certain about whether to receive the given reference signal in the given transmission occasion before performing the energy detection.

In one embodiment, if one condition subset of P condition subset(s) is fulfilled, the first node receives the given reference signal in the given transmission occasion; if none of the P condition subset(s) is fulfilled, the first node drops receiving the given reference signal in the given transmission occasion.

In one subembodiment, a condition subset of the P condition subset(s) comprises that the given transmission occasion belongs to the first-type time window in time domain.

In one subembodiment, a condition subset of the P condition subset(s) comprises that the given transmission occasion belongs to the first-type time window in time domain, and that the given reference signal is QCLed with a reference signal comprised in a reference signal group corresponding to a first-type time window to which the given transmission occasion belongs.

In one subembodiment, a condition subset of the P condition subset(s) comprises that the first node detects a dynamic signaling indicating that one or more multicarrier symbols occupied by the given transmission occasion will be used for a transmission from a transmitter of the given reference signal to the first node.

In one subembodiment, P is a positive integer greater than 1.

In one subembodiment, P is equal to 1.

In one embodiment, the above method in the second node used for wireless communications includes:

performing a second access detection; herein, a result of the second access detection is used to determine whether to transmit the given reference signal in the given transmission occasion.

In one embodiment, the second access detection is LBT.

In one embodiment, the second access detection is Category 4 LBT.

In one embodiment, the second access detection is Category 2 LBT.

In one embodiment, the second access detection is CCA.

In one embodiment, the second access detection is implemented in a way defined by 3GPP TS37.213, section 4.

In one embodiment, the second access detection is a DL Channel access procedure.

In one embodiment, the specific way of implementation of DL Channel access procedure can be found in 3GPP TS37.213, section 4.1.

In one embodiment, the second access detection is a Type 1 DL Channel access procedure.

In one embodiment, the second access detection is a Type 2 DL Channel access procedure.

In one embodiment, the second access detection is performed on a sub-band to which the given reference signal belongs.

In one embodiment, the second access detection is performed on a serving cell to which the given reference signal belongs.

In one embodiment, the second access detection is used by the second node for determining whether a sub-band to which the given reference signal belongs is idle.

In one embodiment, the second access detection is used by the second node for determining whether a sub-band to which the given reference signal belongs is idle in the given transmission occasion.

In one embodiment, if the result of the second access detection indicates that a sub-band to which the given reference signal is idle, the second node transmits the given reference signal in the given transmission occasion; otherwise, the second node drops transmitting the given reference signal in the given transmission occasion.

Embodiment 14

Embodiment 14 illustrates a structure block diagram of a processing device in a first node according to one embodiment of the present disclosure; as shown in FIG. 14. In FIG. 14, a processing device 1400 in a first node comprises a first transmitter 1401 and a first processor 1402.

In Embodiment 14, the first transmitter 1401 transmits a first signal; and the first processor 1402 monitors a first-type signaling in a first resource block in a first time window in a first sub-band.

In Embodiment 14, the first signal is used to determine a first reference signal; for the monitoring on the first-type signaling in the first resource block in the first time window, the first node assumes same QCL parameters as a target reference signal; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In one embodiment, the first processor 1402 receives a first signaling; herein, the first time window belongs to the target time window; the first signaling is used to determine the target time window and the target reference signal group.

In one embodiment, the first processor 1402 performs a first access detection; and the first transmitter 1401 transmits a second signal after completion of the first access detection; herein, the first time window belongs to the target time window; the second signal is used to determine the target time window and the target reference signal group.

In one embodiment, the first processor 1402 determines whether a first condition is fulfilled for each first-type reference signal in a first-type reference signal set; herein, whether each first-type reference signal comprised in the first-type reference signal set fulfills the first condition is used to determine whether the first signal is transmitted; the first node determines that each first-type reference signal comprised in the first-type reference signal set fulfills the first condition, and determines to transmit the first signal; the given first-type reference signal is any first-type reference signal comprised in the first-type reference signal set, and a first transmission occasion set is reserved for the given first-type reference signal; when the given first-type reference signal fulfills one of a first condition subset and a second condition subset, the given first-type reference signal fulfills the first condition;

the first condition subset comprises: a number of transmission occasions comprised by a first occasion subset is greater than a first threshold; the first node drops receiving the given first-type reference signal in the first occasion subset, the first occasion subset being a subset of the first transmission occasion set;

the second condition subset comprises: a first received quality is lower than a second threshold; a measurement on the given first-type reference signal in a second occasion subset is used to determine the first received quality, and the first node receives the given first-type reference signal in the second occasion subset, the second occasion subset being a subset of the first transmission occasion set.

In one embodiment, the first processor 1402 determines whether to receive the given first-type reference signal in a first given transmission occasion; herein, the first given transmission occasion is one transmission occasion in the first transmission occasion set.

In one embodiment, the first processor 1402 whether a second condition is fulfilled for each second-type reference signal comprised in a second-type reference signal set; herein, a second-type reference signal subset is composed of second-type reference signals comprised in the second-type reference signal set that fulfill the second condition, and the first reference signal is a second-type reference signal in the second-type reference signal subset; a given second-type reference signal is any second-type reference signal comprised in the second-type reference signal set, and a second transmission occasion set is reserved for the given second-type reference signal; when the given second-type reference signal fulfills both a third condition subset and a fourth condition subset, the given second-type reference signal fulfills the second condition.

the third condition subset comprises: a number of transmission occasions comprised by a third occasion subset is greater than a third threshold; the first node receives the given second-type reference signal in the third occasion subset, the third occasion subset being a subset of the second transmission occasion set;

the fourth condition subset comprises: a second channel quality is greater than or equal to a fourth threshold; a measurement on the given second-type reference signal in the third occasion subset is used to determine the second channel quality.

In one embodiment, the first processor 1402 determines whether to receive the given second-type reference signal in a second given transmission occasion; herein, the second given transmission occasion is one transmission occasion in the second transmission occasion set.

In one embodiment, the first node is a UE.

In one embodiment, the first node is a relay node.

In one embodiment, the first transmitter 1401 comprises at least one of the antenna 452, the transmitter 454, the transmitting processor 468, the multi-antenna transmitting processor 457, the controller/processor 459, the memory 460 or the data source 467 in Embodiment 4.

In one embodiment, the first processor 1402 comprises at least one of the antenna 420, the receiver 454, the receiving processor 456, the multi-antenna receiving processor 458, the controller/processor 459, the memory 460 or the data source 467 in Embodiment 4.

Embodiment 15

Embodiment 15 illustrates a structure block diagram of a processing device in a second node according to one embodiment of the present disclosure; as shown in FIG. 15. In FIG. 15, a processing device 1500 in a second node comprises a first processor and a second processor 1502.

In Embodiment 15, the first receiver 1501 receives a first signal; the second processor 1502 transmits a first-type signaling in a first resource block in a first time window in a first sub-band, or drops transmitting the first-type signaling in the first resource block in the first time window in the first sub-band.

In Embodiment 15, the first signal is used to determine a first reference signal; a transmitter of the first signal assumes a QCL parameter identical to a target reference signal for monitoring the first-type signaling in the first resource block in the first time window in the first sub-band; the target reference signal is either the first reference signal or a second reference signal; whether the first time window belongs to a first-type time window is used to determine the target reference signal between the first reference signal and the second reference signal; any said first-type time window corresponds to a reference signal group, a target time window is the first-type time window, and the target time window corresponds to a target reference signal group; when the first time window belongs to the target time window, whether the first reference signal and one reference signal from the target reference signal group are QCLed is used to determine the target reference signal between the first reference signal and the second reference signal.

In Embodiment 15, the second processor 1502 transmits a first signaling; herein, the first time window belongs to the target time window; the first signaling is used to determine the target time window and the target reference signal group.

In one embodiment, the first receiver 1501 receives a second signal; herein, the first time window belongs to the target time window; the second signal is used to determine the target time window and the target reference signal group.

In one embodiment, the second processor 1502 determines whether to transmit a given first-type reference signal in a first given transmission occasion; herein, the given first-type reference signal is any first-type reference signal comprised in a first-type reference signal set, and the first-type reference signal set is used to determine whether the first signal is transmitted; a first transmission occasion set is reserved for the given first-type reference signal, and the first given transmission occasion is one transmission occasion in the first transmission occasion set.

In one embodiment, the second processor 1502 determines whether to transmit a given second-type reference signal in a second given transmission occasion; herein, the given second-type reference signal is any second-type reference signal comprised in a second-type reference signal set, and the first reference signal is a second-type reference signal in the second-type reference signal set; a second transmission occasion set is reserved for the given second-type reference signal, and the second given transmission occasion is one transmission occasion in the second transmission occasion set.

In one embodiment, the second node is a base station.

In one embodiment, the second node is a UE.

In one embodiment, the second node is a relay node.

In one embodiment, the first receiver 1501 comprises at least one of the antenna 420, the receiver 418, the receiving processor 470, the multi-antenna receiving processor 472, the controller/processor 475 or the memory 476 in Embodiment 4.

In one embodiment, the second processor 1502 comprises at least one of the antenna 420, the transmitter 418, the transmitting processor 416, the multi-antenna transmitting processor 471, the controller/processor 475 or the memory 476 in Embodiment 4.

Embodiment 16

Embodiment 16 illustrates a flowchart of a first-type signaling, a first signaling, a second-type signaling and a third-type signaling according to one embodiment of the present disclosure, as shown in FIG. 16. In 1600 illustrated by FIG. 16, each box represents a step. Particularly, the sequential order of steps arranged in the boxes does not imply any specific chronological order of these steps.

In Embodiment 16, the first node in the present disclosure monitors a first-type signaling in a first resource block set in a first time window in a first sub-band in step 1601; and receives a first signaling in a first resource block in step 1602; monitors a second-type signaling in a second resource block set in a second time window in the first sub-band in step 1603; and monitors a third-type signaling in a target resource block set in a third time window in a second sub-band in step 1604. Herein, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the first node monitors the second-type signaling in the second resource block set in the first sub-band in the second time window.

In one embodiment, the first node stops monitoring the first-type signaling in the first resource block set in the first sub-band in the second time window.

In one embodiment, the first node stops monitoring the first-type signaling in the first resource block set when starting to monitor the second-type signaling in the second resource block set.

In one embodiment, the first node stops monitoring the first-type signaling in the first resource block set in the first place and then starts to monitor the second-type signaling in the second resource block set.

In one embodiment, the target resource block set is one of 2 candidate resource block sets; the second-type indexes corresponding to the 2 candidate resource block sets are of unequal values, and the first-type indexes corresponding to the 2 candidate resource block sets are equal to the second index, both of the 2 candidate resource block sets belonging to the second sub-band in frequency domain.

In one embodiment, the phrase of whether the second-type index corresponding to the target resource block set aligns with the second-type index corresponding to the second resource block set means whether it is dependent on the second-type index corresponding to the second resource block set when it comes to which one of the 2 candidate resource block sets is the target resource block set.

In one embodiment, the phrase of whether the second-type index corresponding to the target resource block set aligns with the second-type index corresponding to the second resource block set means whether the second-type index corresponding to the target resource block set is inevitably equal to the second-type index corresponding to the second resource block set.

In one embodiment, the phrase of whether the second-type index corresponding to the target resource block set aligns with the second-type index corresponding to the second resource block set means whether the target resource block set is inevitably one of the 2 candidate resource block sets whose corresponding second-type index is equal to the second-type index corresponding to the second resource block set.

In one embodiment, the phrase of whether the second-type index corresponding to the target resource block set aligns with the second-type index corresponding to the second resource block set means whether the first node, during its switch to the second resource block set in the first subcarrier, shall be synchronously switched to a resource block set in the second subcarrier whose corresponding second-type index is equal to the second-type index corresponding to the second resource block set.

In one embodiment, the phrase of whether the second-type index corresponding to the target resource block set aligns with the second-type index corresponding to the second resource block set means whether the first signaling is used to determine a switch to the target resource block set in the third time window in the second subcarrier.

In one embodiment, the phrase of whether the second-type index corresponding to the target resource block set aligns with the second-type index corresponding to the second resource block set means whether the first bit string is used to determine a switch to the target resource block set in the third time window in the second subcarrier.

In one embodiment, when the second-type index corresponding to the target resource block set is aligned with the second-type index corresponding to the second resource block set, the second-type index corresponding to the target resource block set is equal to the second-type index corresponding to the second resource block set all the time.

In one embodiment, when the second-type index corresponding to the target resource block set is aligned with the second-type index corresponding to the second resource block set, the target resource block set remains one of the 2 candidate resource block sets whose corresponding second-type index is equal to the second-type index corresponding to the second resource block set.

In one embodiment, when the second-type index corresponding to the target resource block set is aligned with the second-type index corresponding to the second resource block set, the first node is synchronously switched to a resource block set with the corresponding second-type index being equal to the second-type index corresponding to the second resource block set in the second subcarrier during its switch to the second resource block in the first subcarrier.

In one embodiment, when the second-type index corresponding to the target resource block set is not aligned with the second-type index corresponding to the second resource block set, the second-type index corresponding to the target resource block set is unrelated to the second-type index corresponding to the second resource block set.

In one embodiment, when the second-type index corresponding to the target resource block set is not aligned with the second-type index corresponding to the second resource block set, which one of the 2 candidate resource block sets is the target resource block set is unrelated to a value of the second-type index corresponding to the second resource block set.

In one embodiment, when the second-type index corresponding to the target resource block set is aligned with the second-type index corresponding to the second resource block set, the third time window lasts as long as the second time window.

In one embodiment, the monitoring refers to blind decoding, namely, receiving a signal and performing decoding operation; if the decoding is determined as correct according to a Cyclic Redundancy Check (CRC) bit, it is determined that a given signaling is detected; otherwise, it is determined that the given signaling is not detected.

In one embodiment, the monitoring refers to reception based on coherent detection, namely, performing coherent reception and measuring energy of a signal obtained by the coherent reception; if the energy of the signal obtained by the coherent reception is greater than a first given threshold, it is determined that a given signaling is detected; otherwise, it is determined that the given signaling is not detected.

In one embodiment, the monitoring refers to reception based on energy detection, namely, sensing energy of radio signals and averaging to acquire a received energy; if the received energy is greater than a second given threshold, it is determined that a given signaling is detected; otherwise, it is determined that the given signaling is not detected.

In one embodiment, the phrase of monitoring a given signaling means that the first node determines whether the given signaling is to be transmitted according to CRC.

In one embodiment, the phrase of monitoring a given signaling means that the first node is uncertain about whether the given signaling is to be transmitted before determining whether the decoding is correct according to CRC.

In one embodiment, the phrase of monitoring a given signaling means that the first node determines whether the given signaling is to be transmitted according to the coherent detection.

In one embodiment, the phrase of monitoring a given signaling means that the first node is uncertain about whether the given signaling is to be transmitted before the coherent detection.

In one embodiment, the phrase of monitoring a given signaling means that the first node determines whether the given signaling is to be transmitted according to the energy detection.

In one embodiment, the phrase of monitoring a given signaling means that the first node is uncertain about whether the given signaling is to be transmitted before the energy detection.

In one embodiment, the given signaling is any one of the first-type signaling, the second-type signaling or the third-type signaling.

In one embodiment, the given signaling is the first-type signaling.

In one embodiment, the given signaling is the second-type signaling.

In one embodiment, the given signaling is the third-type signaling.

In one embodiment, the given signaling comprises a physical layer signaling.

In one embodiment, the given signaling comprises a dynamic signaling.

In one embodiment, the given signaling comprises a L1 signaling.

In one embodiment, the given signaling comprises a L1 control signaling.

In one embodiment, the given signaling comprises a higher layer signaling.

In one embodiment, the given signaling comprises Downlink control information (DCI).

In one embodiment, the given signaling comprises one or more fields of a piece of DCI.

In one embodiment, the given signaling comprises one or more fields of a piece of Sidelink Control Information (SCI).

In one embodiment, the given signaling format includes one or more formats in a first format set.

In one embodiment, the first format set comprises DCI Format 0_0, DCI Format 0_1, DCI Format 0_2, DCI Format 1_0, DCI Format 1_1, DCI Format 1_2, DCI Format 2_0, DCI Format 2_1, DCI Format 2_2, DCI Format 2_3, DCI Format 2_4, DCI Format 2_5 and DCI Format 2_6.

In one embodiment, there is a common format shared by a format included by the first-type signaling and a format included by the second-type signaling.

In one embodiment, there is a common format shared by a format included by the first-type signaling and a format included by the third-type signaling.

In one embodiment, there is a common format shared by a format included by the second-type signaling and a format included by the third-type signaling.

In one embodiment, there is a format not belonging to the format included by the first-type signaling and the format included by the second-type signaling simultaneously.

In one embodiment, there is a format not belonging to the format included by the first-type signaling and the format included by the third-type signaling simultaneously.

In one embodiment, there is a format not belonging to the format included by the second-type signaling and the format included by the third-type signaling simultaneously.

In one embodiment, the first signaling comprises a physical layer signaling.

In one embodiment, the first signaling comprises a dynamic signaling.

In one embodiment, the first signaling comprises a L1 signaling.

In one embodiment, the first signaling comprises a higher layer signaling.

In one embodiment, the first signaling comprises DCI.

In one embodiment, the first signaling comprises one or more fields of a piece of DCI.

In one embodiment, the first signaling comprises one or more fields of a piece of SCI.

In one embodiment, the first signaling is the first-type signaling.

In one embodiment, the first signaling is not the first-type signaling.

In one embodiment, the format of the first signaling is DCI Format 2_0.

In one embodiment, the format of the first signaling is a format in the first format set.

In one embodiment, a time-domain resource occupied by the first signaling belongs to the first time window.

In one embodiment, a time-domain resource occupied by the first signaling does not belong to the first time window.

In one embodiment, an end of the first time window is an end time of the first signaling.

In one embodiment, an end of the first time window is an end time of a time unit occupied by the first signaling.

In one embodiment, an end of the first time window is after a positive integer number of multicarrier symbol(s) subsequent to an end time of the first signaling.

In one embodiment, an end time of a time-domain resource occupied by the first signaling is no later than a start of the second time window.

In one embodiment, a first symbol is a last multicarrier symbol occupied by the first signaling, and a start of the second time window is a start time of a first time unit; the first time unit is an earliest time unit after at least P1 symbols following the first symbol, P1 being a positive integer greater than 1.

In one subembodiment, a time interval between a start time of the first time unit and an end time of the first symbol is no smaller than P1 symbols.

In one embodiment, a first reference subcarrier spacing is used to determine a length of the first symbol.

In one embodiment, a second reference subcarrier spacing is used to determine a length of the first symbol.

In one embodiment, the first symbol is a multicarrier symbol for the first reference subcarrier spacing.

In one embodiment, the first symbol is a multicarrier symbol for the second reference subcarrier spacing.

In one embodiment, a length of any symbol of the P1 symbols is determined based on a first reference subcarrier spacing.

In one embodiment, a length of any symbol of the P1 symbols is determined based on a second reference subcarrier spacing.

In one embodiment, any one of the P1 symbols is a multicarrier symbol for a first reference subcarrier spacing.

In one embodiment, any one of the P1 symbols is a multicarrier symbol for a second reference subcarrier spacing.

In one embodiment, the second reference subcarrier spacing is different from the first reference subcarrier spacing.

In one embodiment, the P1's value is dependent on the first reference subcarrier spacing.

In one embodiment, the P1's value is dependent on the first node's capability.

In one embodiment, for any given said first reference subcarrier spacing and the first node's capability, the P1's value is fixed.

In one embodiment, the first reference subcarrier spacing is a smallest one of W1 subcarrier spacings, W1 being a positive integer greater than 1; the W1 subcarrier spacings are respectively subcarrier spacings corresponding to active BWPs of W1 serving cells, and the W1 serving cells are added by the first node; the first serving cell is one of the W1 serving cells.

In one embodiment, the first serving cell is one of W1 serving cells, W1 being a positive integer greater than 1, and the W1 serving cells are added by the first node; the first reference subcarrier spacing is a smallest one of subcarrier spacings corresponding to all BWPs configured in the W1 serving cells.

In one embodiment, the second serving cell is one of the W1 serving cells.

In one embodiment, the second serving cell does not belong to the W1 serving cells.

In one embodiment, the third-type indexes corresponding to the W1 serving cells are of an equal value.

In one embodiment, for any given serving cell of the W1 serving cells, the first node is configured to monitor a PDCCH in a reference resource block set in an active BWP corresponding to the given serving cell, and the first-type index corresponding to the reference resource block set is equal to the first index.

In one embodiment, for any given serving cell of the W1 serving cells, the first node is configured to monitor a PDCCH in a reference resource block set in an active BWP corresponding to the given serving cell, and a pair of the third-type index-the first-type index corresponding to the reference resource block set that corresponds to the given serving cell belongs to the first index pair set.

In one embodiment, the first signaling belongs to one of the W1 serving cells in frequency domain.

In one embodiment, the second reference subcarrier spacing is pre-set.

In one embodiment, the second reference subcarrier spacing is a subcarrier spacing of a BWP that the first signaling belongs to.

In one embodiment, the second reference subcarrier spacing is a largest one of the W1 subcarrier spacings.

In one embodiment, the time unit is a slot.

In one embodiment, the time unit is a first-type reference slot.

In one embodiment, a length of the first-type reference slot is determined on the basis of the first reference subcarrier spacing.

In one embodiment, the first-type reference slot is a slot corresponding to the first reference subcarrier spacing.

In one embodiment, a length of the first-type reference slot is determined on the basis of the second reference subcarrier spacing.

In one embodiment, the first-type reference slot is a slot corresponding to the second reference subcarrier spacing.

In one embodiment, a said time unit comprises a positive integer number of multicarrier symbol(s).

In one embodiment, a said time unit comprises a positive integer number of first-type reference multicarrier symbol(s).

In one embodiment, a length of the first-type reference multicarrier symbol is determined on the basis of the first reference subcarrier spacing.

In one embodiment, the first-type reference multicarrier symbol is a multicarrier symbol corresponding to the first reference subcarrier spacing.

In one embodiment, a length of the first-type reference multicarrier symbol is determined on the basis of the second reference subcarrier spacing.

In one embodiment, the first-type reference multicarrier symbol is a multicarrier symbol corresponding to the second reference subcarrier spacing.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM).

In one embodiment, the first signaling indicates a start of monitoring the second-type signaling in the second resource block set in the second time window.

In one embodiment, the first signaling indicates a stop of monitoring the first-type signaling in the first resource block set in the second time window.

In one embodiment, the first signaling indicates a switch from the first resource block set to the second resource block set.

In one embodiment, the first signaling comprises a first bit string, and the first bit string in the first signaling indicates a start of monitoring the second-type signaling in the second resource block set in the second time window.

In one subembodiment, the first bit string in the first signaling indicates a stop of monitoring the first-type signaling in the first resource block set in the second time window.

In one embodiment, the first signaling comprises a first bit string, and the first bit string in the first signaling indicates a switch from the first resource block set to the second resource block set.

In one embodiment, the first signaling comprises a first bit string, and the first bit string in the first signaling indicates a first value, and the second-type index corresponding to the second resource block set is equal to the first value.

In one embodiment, if the first node is configured with a first parameter, the first signaling comprises the first bit string; the first parameter is a higher layer parameter.

In one embodiment, the first parameter comprises all or part of information contained in a higher layer parameter SearchSpaceSwitchTrigger-r16.

In one embodiment, the first signaling comprises a first field, and the first field comprised by the first signaling comprises M1 bit strings, M1 being a positive integer greater than 1; the first bit string is one of the M1 bit strings.

In one embodiment, any one of the M1 bit strings corresponds to a said third-type index.

In one embodiment, any one of the M1 bit strings corresponds to a pair of the third-type index-the first-type index.

In one embodiment, the first bit string corresponds to the third index.

In one embodiment, the first bit string corresponds to the third index-the first index pair.

In one embodiment, a position of the first bit string among the M1 bit strings is configured by a higher layer signaling.

In one embodiment, a name of the higher-layer signaling for configuring the position of the first bit string among the M1 bit strings includes SlotFormat.

In one embodiment, the first bit string only comprises one bit.

In one embodiment, the first bit string comprises more than one bit.

In one embodiment, the first signaling implicitly indicates a switch from the first resource block set to the second resource block set.

In one embodiment, the fact of the first signaling being detected is used for indicating a switch from the first resource block set to the second resource block set.

In one embodiment, if the second-type index corresponding to the first resource block set is equal to 0 and the first resource block belongs to the first resource block set, once detecting the first signaling, the first node starts to monitor the second-type signaling in the second resource block set in the second time window.

In one embodiment, if the second-type index corresponding to the first resource block set is equal to 0 and the first resource block belongs to the first resource block set, once detecting the first signaling, the first node stops monitoring the first-type signaling in the first resource block set in the second time window.

In one embodiment, the first signaling is a said first-type signaling that is first detected by the first node in the first resource block set in the first time window.

In one embodiment, the first signaling comprises a bit field, and the bit field indicates the first index.

In one embodiment, the first signaling comprises a bit field, and the bit field indicates the third index.

In one embodiment, a position of the first bit string among the M1 bit strings is used to determine the third index.

In one embodiment, a position of the first bit string among the M1 bit strings is used to determine the third index-the first index pair.

In one embodiment, a time-frequency resource occupied by the first signaling is used to determine the first index.

In one embodiment, a time-frequency resource occupied by the first signaling is used to determine the third index.

In one embodiment, the first resource block belongs to the first resource block set, and the first index is equal to the first-type index corresponding to the first resource block set.

In one embodiment, whether a CORESET associated with the first resource block is configured with a CORESETPoolIndex along with, if configured, a value of the CORESETPoolIndex is used to determine the first index.

In one embodiment, if the CORESET associated with the first resource block is not configured with a CORESETPoolIndex, the first index is equal to 0.

In one embodiment, if the CORESET associated with the first resource block is configured with a CORESETPoolIndex equal to 0, the first index is equal to 0.

In one embodiment, if the CORESET associated with the first resource block is configured with a CORESETPoolIndex equal to 1, the first index is equal to 1.

In one embodiment, the third index is the third-type index corresponding to a serving cell to which the first signaling belongs.

Embodiment 17

Figure 17:
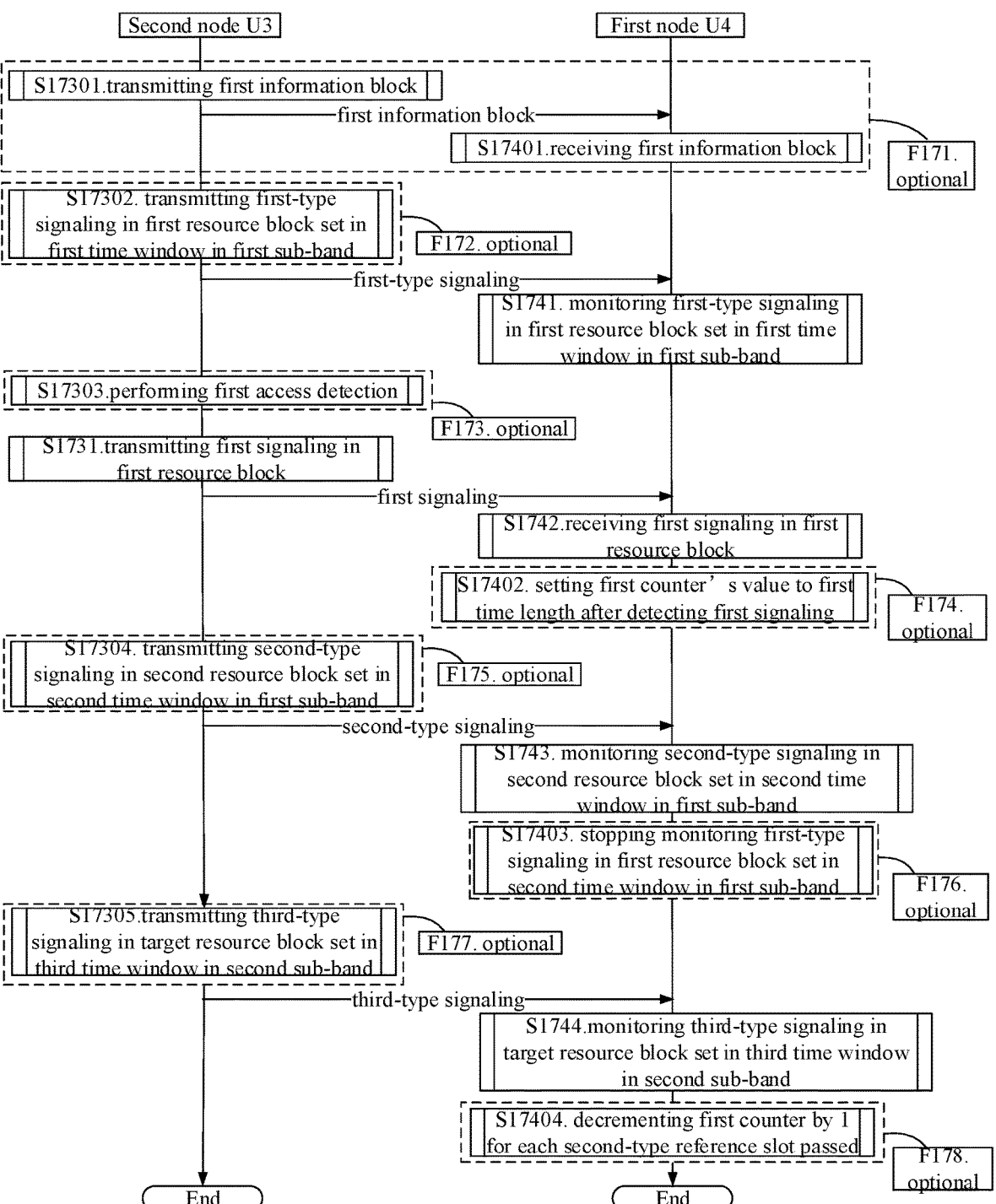
FIG. 17 illustrates a flowchart of wireless transmission according to one embodiment of the present disclosure.

Embodiment 17 illustrates a flowchart of wireless transmission according to one embodiment of the present disclosure, as shown in FIG. 17. In FIG. 17, a second node U3 and a first node U4 are communication nodes in transmission via an air interface. As illustrated by FIG. 17, steps marked by boxes from F171 to F178 are optional, respectively.

The second node U3 transmits a first information block in step S17301; transmits a first-type signaling in a first resource block set in a first time window in a first sub-band in step S17302; and performs a first access detection in step S17303; transmits a first signaling in step S1731; transmits a second-type signaling in a second resource block set in a second time window in the first sub-band in step S17304; and transmits a third-type signaling in a target resource block set in a third time window in a second sub-band in step S17305.

The first node U4 receives a first information block in step S17401; monitors a first-type signaling in a first resource block set in a first time window in a first sub-band in step S1741; and receives a first signaling in a first resource block in step S1742; configures a first counter's value as a first time length after detecting the first signaling in step S17402; monitors a second-type signaling in a second resource block set in a second time window in the first sub-band in step S1743; and stops monitoring the first-type signaling in the first resource block set in the second time window in the first sub-band in step S17403; monitors a third-type signaling in a target resource block set in a third time window in a second sub-band in step S1744; and decrements the first counter by 1 for each passed second-type reference slot in step S17404.

In Embodiment 17, the first signaling is used by the first node U4 for determining to monitor the second-type signaling in the second resource block set in the second time window in the first sub-band; the first signaling is used by the first node U4 to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used by the first node U4 to determine whether the second-type index corresponding to the target resource block set aligns with the second-type index corresponding to the second resource block set; the first signaling is used by the first node U4 to determine a start of the second time window, a start of the third time window being the same as the start of the second time window.

In one embodiment, the first node U4 is the first node in the present disclosure.

In one embodiment, the second node U3 is the second node in the present disclosure.

In one embodiment, an air interface between the second node U3 and the first node U4 includes a radio interface between a base station and a UE.

In one embodiment, an air interface between the second node U3 and the first node U4 includes a radio interface between UEs.

In one embodiment, the second node U3 is a maintenance base station for a serving cell of the first node U4.

In one embodiment, the first resource block belongs to the first resource block set, and the first signaling is a said first-type signaling; the second node transmits the first-type signaling other than the first signaling in the first resource block set in the first time window in the first sub-band, or, the second node drops transmitting the first-type signaling other than the first signaling in the first resource block set in the first time window in the first sub-band.

In one embodiment, the first-type signaling is transmitted on a PDCCH.

In one embodiment, the first-type signaling is transmitted on a Physical Sidelink Control Channel (PSCCH).

In one embodiment, the second-type signaling is transmitted on a PDCCH.

In one embodiment, the second-type signaling is transmitted on a PSCCH.

In one embodiment, the third-type signaling is transmitted on a PDCCH.

In one embodiment, the third-type signaling is transmitted on a PSCCH.

In one embodiment, the first signaling is transmitted on a PDCCH.

In one embodiment, the first signaling is transmitted on a PSCCH.

In one embodiment, steps marked by the box F171 in FIG. 17 exist; the first information block is used by the first node U4 for determining a first index pair set; the third index-the first index pair belongs to the first index pair set; whether the fourth index-the second index pair belongs to the first index pair set is used to determine whether the second-type index corresponding to the target resource block set is aligned with the second-type index corresponding to the second resource block set.

In one embodiment, the first information block is transmitted on a downlink physical layer data channel (i.e., a downlink channel capable of carrying physical layer data).

In one embodiment, the first information block is transmitted on a Physical Downlink Shared CHannel (PDSCH).

In one embodiment, the first information block is transmitted on a Physical Sidelink Shared Channel (PSSCH).

In one embodiment, the steps marked by the box F171 in FIG. 17 do not exist.

In one embodiment, the step marked by the box F172 in FIG. 17 exists.

In one embodiment, the step marked by the box F172 in FIG. 17 does not exist.

In one embodiment, the step marked by the box F173 in FIG. 17 exists; the first access detection is used by the second node U3 for determining that the first signaling can be transmitted in the first resource block.

In one embodiment, the first resource block belongs to a reference sub-band in frequency domain, the first access detection is performed on the reference sub-band, and the first access detection is used to determine whether the reference sub-band is idle.

In one embodiment, an end time of the first access detection is no later than a start time of a time-domain resource occupied by the first signaling.

In one embodiment, the first access detection is Listen Before Talk (LBT).

In one embodiment, the first access detection is Category 4 LBT.

In one embodiment, the first access detection is Category 2 LBT.

In one embodiment, for the specific way of implementing LBT, refer to 3GPP TR36.889.

In one embodiment, the first access detection is a Clear Channel Assessment (CCA).

In one embodiment, for the specific way of implementing CCA, refer to 3GPP TR36.889.

In one embodiment, the first access detection is implemented in a way defined by 3GPP TS37.213, section 4.

In one embodiment, the first access detection is a DL Channel access procedure.

In one embodiment, for the specific way of implementing DL Channel access procedure, refer to 3GPP TS37.213, section 4.1.

In one embodiment, the first access detection is a Type 1 DL Channel access procedure.

In one embodiment, the first access detection is a Type 2 DL Channel access procedure.

In one embodiment, the first access detection is a UL Channel access procedure.

In one embodiment, for the specific way of implementing UL Channel access procedure, refer to 3GPP TS37.213, section 4.2.

In one embodiment, the first access detection is a Type 1 UL Channel access procedure.

In one embodiment, the first access detection is a Type 2 UL Channel access procedure.

In one embodiment, the step marked by the box F174 in FIG. 17 exists.

In one embodiment, the step marked by the box F174 in FIG. 17 does not exist.

In one embodiment, the step marked by the box F175 in FIG. 17 exists.

In one embodiment, the step marked by the box F175 in FIG. 17 does not exist.

In one embodiment, the step marked by the box F176 in FIG. 17 exists.

In one embodiment, the step marked by the box F176 in FIG. 17 does not exist.

In one embodiment, the step marked by the box F177 in FIG. 17 exists.

In one embodiment, the step marked by the box F177 in FIG. 17 does not exist.

In one embodiment, the step marked by the box F178 in FIG. 17 exists.

In one embodiment, the step marked by the box F178 in FIG. 17 does not exist.

Embodiment 18

Figures 18, 19, 20, 21, 22, 23:
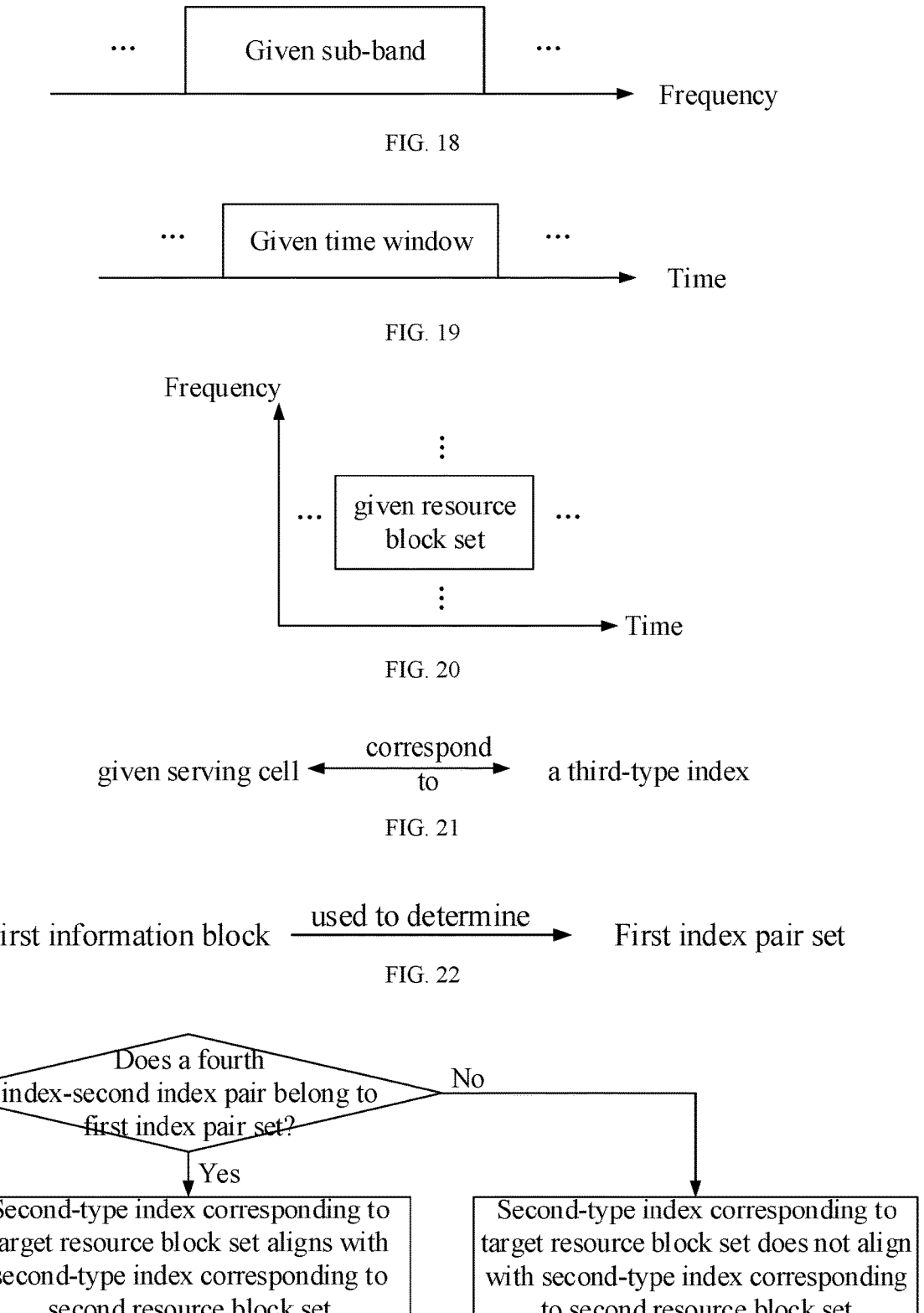
FIG. 18 illustrates a schematic diagram of a given sub-band according to one embodiment of the present disclosure.
FIG. 19 illustrates a schematic diagram of a given time window according to one embodiment of the present disclosure.
FIG. 20 illustrates a schematic diagram of a given resource block set according to one embodiment of the present disclosure.
FIG. 21 illustrates a schematic diagram of a given serving cell corresponding to a third-type index according to one embodiment of the present disclosure.
FIG. 22 illustrates a schematic diagram of a first information block according to one embodiment of the present disclosure.
FIG. 23 illustrates a schematic diagram of a first index, a second index, a third index and a fourth index jointly being used to determine whether a second-type index corresponding to a target resource block set aligns with a second-type index corresponding to a second resource block set according to one embodiment of the present disclosure.

Embodiment 18 illustrates a schematic diagram of a given sub-band according to one embodiment of the present disclosure; as shown in FIG. 18. In Embodiment 18, the given sub-band is any one of the first sub-band, the second sub-band or a sub-band to which the first signaling belongs.

In one embodiment, the given sub-band is the first sub-band.

In one embodiment, the given sub-band is the second sub-band.

In one embodiment, the given sub-band is a sub-band to which the first signaling belongs.

In one embodiment, the given sub-band is deployed on Unlicensed Spectrum.

In one embodiment, the given sub-band is deployed on Licensed Spectrum.

In one embodiment, the given sub-band comprises a carrier.

In one embodiment, the given sub-band comprises multiple carriers.

In one embodiment, the given sub-band comprises a BWP.

In one embodiment, the given sub-band comprises multiple BWPs.

In one embodiment, the given sub-band comprises one Resource Block (RB) set or multiple consecutive RB sets in a BWP.

In one embodiment, the given sub-band is a contiguous frequency-domain zone.

In one embodiment, the given sub-band comprises a positive integer number of (more than one) consecutive subcarriers in frequency domain.

In one embodiment, the first sub-band and the second sub-band are mutually orthogonal.

In one embodiment, the first sub-band is the second sub-band.

In one embodiment, the first sub-band and the second sub-band respectively belong to different serving cells.

In one embodiment, the first sub-band and the second sub-band respectively comprise two BWPs of different serving cells.

In one embodiment, the first sub-band and the second sub-band belong to a same serving cell.

In one embodiment, the first sub-band and the second sub-band respectively comprise different BWPs of a same serving cell.

Embodiment 19

Embodiment 19 illustrates a schematic diagram of a given time window according to one embodiment of the present disclosure; as shown in FIG. 19. In Embodiment 19, the given time window is any time window of the first time window, the second time window, the third time window or the first reference time window.

In one embodiment, the given time window is the first time window.

In one embodiment, the given time window is the second time window.

In one embodiment, the given time window is the third time window.

In one embodiment, the given time window is the first reference time window.

In one embodiment, the given time window is a contiguous duration.

In one embodiment, the given time window comprises a positive integer number of consecutive multicarrier symbols.

In one embodiment, the given time window comprises a positive integer number of consecutive first-type reference multicarrier symbols.

In one embodiment, the given time window comprises a positive integer number of slots.

In one embodiment, the given time window comprises a positive integer number of first-type reference slots.

In one embodiment, the given time window comprises a positive integer number of second-type reference slots.

In one embodiment, the given time window is of a length no greater than 10000 ms.

In one embodiment, the given time window is of a length no greater than 10 ms.

In one embodiment, the first time window and the second time window are mutually orthogonal.

In one embodiment, an end of the first time window is no later than a start of the second time window.

In one embodiment, an end of the first time window is a start of the second time window.

In one embodiment, an end of the first time window is earlier than a start of the second time window.

In one embodiment, the third time window and the second time window are of equal length.

In one embodiment, the third time window and the second time window are of unequal lengths.

Embodiment 20

Embodiment 20 illustrates a schematic diagram of a given resource block set according to one embodiment of the present disclosure; as shown in FIG. 20. In Embodiment 20, the given resource block set is any resource block set of the first resource block set, the second resource block set, the target resource block set, the 2 candidate resource block sets or the third resource block set.

In one embodiment, the given resource block set is the first resource block set.

In one embodiment, the given resource block set is the second resource block set.

In one embodiment, the given resource block set is the target resource block set.

In one embodiment, the given resource block set is any one of the 2 candidate resource block sets.

In one embodiment, the given resource block set is the third resource block set.

In one embodiment, the given resource block set comprises time-domain resources.

In one embodiment, the given resource block set comprises frequency-domain resources.

In one embodiment, the given resource block set occupies a positive integer number of RE(s) in time-frequency domain.

In one embodiment, an RE occupies a multicarrier symbol in time domain and a subcarrier in frequency domain.

In one embodiment, the given resource block set occupies a positive integer number of multicarrier symbol(s) in time domain.

In one embodiment, the given resource block set occupies a positive integer number of RB(s) in frequency domain.

In one embodiment, the given resource block set comprises a positive integer number of resource block(s).

In one embodiment, the given resource block set comprises a search space set group.

In one embodiment, the given resource block set is a search space set group.

In one embodiment, the given resource block set comprises a search space set.

In one embodiment, the given resource block set comprises all search space sets in a search space set group.

In one embodiment, the given resource block set comprises part of search space sets in a search space set group.

In one embodiment, the given resource block set comprises a CORESET.

In one embodiment, the given resource block set comprises one or multiple PDCCH candidates.

In one embodiment, the given resource block set comprises all or part of PDCCH candidates in a search space set.

In one embodiment, the given resource block set comprises all or part of PDCCH candidates comprised by each search space set among all or part of search space sets in a search space set group.

In one embodiment, any resource block in the given resource block set comprises a search space set.

In one embodiment, any resource block in the given resource block set comprises a CORESET.

In one embodiment, any resource block in the given resource block set comprises a PDCCH candidate.

In one embodiment, any resource block in the given resource block set comprises all or part of PDCCH candidates in a search space set.

In one embodiment, any two resource blocks in the given resource block set respectively comprise all or part of PDCCH candidates comprised in two search space sets in a same search space set group.

In one embodiment, any resource block in the given resource block set occupies a positive integer number of RE(s) in time-frequency domain.

In one embodiment, any resource block in the given resource block set occupies a positive integer number of multicarrier symbol(s) in time domain.

In one embodiment, any resource block in the given resource block set occupies a positive integer number of PRB(s) in frequency domain.

In one embodiment, the given resource block set comprises a UE-specific Search Space set.

In one embodiment, the given resource block set comprises a Common Search Space set.

In one embodiment, the given resource block set does not comprise any Common Search Space set.

In one embodiment, the first resource block set and the second resource block set respectively comprise two different search space set groups in a same BWP.

In one embodiment, the first resource block set and the second resource block set respectively comprise all or part of PDCCH candidates comprised in two different search space set groups in a same BWP.

In one embodiment, there is a search space set belonging to the first resource block set and the second resource block set simultaneously.

In one embodiment, there isn't any search space set belonging to the first resource block set and the second resource block set simultaneously.

In one embodiment, the first resource block comprises a search space set.

In one embodiment, the first resource block comprises a CORESET.

In one embodiment, the first resource block comprises a PDCCH candidate.

In one embodiment, the first resource block comprises all or part of PDCCH candidates in a search space set.

In one embodiment, the first resource block comprises a Common Search Space set.

In one embodiment, the first resource block comprises a searchSpaceZero.

In one embodiment, a search space index corresponding to the first resource block is 0.

In one embodiment, the first resource block occupies a positive integer number of RE(s) in time-frequency domain.

In one embodiment, the first resource block occupies a positive integer number of multicarrier symbol(s) in time domain.

In one embodiment, the first resource block occupies a positive integer number of PRB(s) in frequency domain.

In one embodiment, the first resource block belongs to the first resource block set.

In one embodiment, the first resource block does not belong to the first resource block set.

In one embodiment, the first resource block belongs to the first sub-band in frequency domain.

In one embodiment, the first resource block does not belong to the first sub-band in frequency domain.

In one embodiment, the first resource block belongs to the first serving cell in frequency domain.

In one embodiment, the first resource block does not belong to the first serving cell in frequency domain.

In one embodiment, a CORESETPoolIndex configured to a CORESET associated with the first resource block is equal to the first index.

In one embodiment, a CORESETPoolIndex configured to a CORESET associated with the first resource block is unequal to the first index.

In one embodiment, a CORESET associated with the first resource block is configured with a CORESETPoolIndex.

In one embodiment, the first resource block set corresponds to a said first-type index and a said second-type index.

In one embodiment, the second resource block set corresponds to a said first-type index and a said second-type index.

In one embodiment, the target resource block set corresponds to a said first-type index and a said second-type index.

In one embodiment, the first-type index is a non-negative integer.

In one embodiment, the first-type index is either 0 or 1.

In one embodiment, the first-type index comprises a CORESETPoolIndex.

In one embodiment, the first-type index is a CORESET-PoolIndex.

In one embodiment, the first-type index comprises a CORESET-ID.

In one embodiment, the first-type index comprises a search space set index.

In one embodiment, a said second-type index is a non-negative integer.

In one embodiment, a said second-type index is 0 or 1.

In one embodiment, a said second-type index is 0, or 1 or 2.

In one embodiment, the second-type index comprises a search space sets group index.

In one embodiment, the second-type index is a search space sets group index.

In one embodiment, the second-type index comprises a CORESETPoolIndex.

In one embodiment, the second-type index comprises a CORESET-ID.

In one embodiment, the second-type index comprises a search space set index.

In one embodiment, any resource block comprised by the given resource block set is a search space set.

In one embodiment, whether a CORESET associated with a resource block in the given resource block set is configured with a CORESETPoolIndex along with, if configured, a value of the CORESETPoolIndex is used to determine the first-type index corresponding to the given resource block set.

In one embodiment, a value of the CORESETPoolIndex configured to a CORESET associated with a resource block in the given resource block set is used to determine the first-type index corresponding to the given resource block set.

In one embodiment, the first-type index corresponding to the given resource block set is a CORESETPoolIndex corresponding to a CORESET associated with any resource block in the given resource block set.

In one embodiment, if a given CORESET is not configured with a CORESETPoolIndex, a CORESETPoolIndex corresponding to the given CORESET is equal to 0, and the given CORESET is a CORESET associated with any resource block in the given resource block set.

In one embodiment, CORESETs respectively associated with any two resource blocks in the given resource block set correspond to a same CORESETPoolIndex.

In one embodiment, CORESETs respectively associated with any two resource blocks in the given resource block set are configured with equal CORESETPoolIndexes.

In one embodiment, for any two given resource blocks in the given resource block set, CORESETs associated with the two given resource blocks are configured with equal CORESETPoolIndexes, or, at least one of the CORESETs associated with the two given resource blocks is not configured with a CORESETPoolIndex.

In one embodiment, if a CORESET associated with a resource block in the given resource block set is configured with a CORESETPoolIndex equal to 0, a CORESET associated with any resource block in the given resource block set is configured with a CORESETPoolIndex equal to 0.

In one embodiment, if a CORESET associated with a resource block in the given resource block set is configured with a CORESETPoolIndex equal to 0, a CORESET associated with any resource block in the given resource block set is configured with a CORESETPoolIndex equal to 0, or is not configured with any CORESETPoolIndex.

In one embodiment, if a CORESET associated with a resource block in the given resource block set is configured with a CORESETPoolIndex equal to 1, a CORESET associated with any resource block in the given resource block set is configured with a CORESETPoolIndex equal to 1.

In one embodiment, if a CORESET associated with a resource block in the given resource block set is configured with a CORESETPoolIndex equal to 1, a CORESET associated with any resource block in the given resource block set is configured with a CORESETPoolIndex equal to 1, or is not configured with any CORESETPoolIndex.

In one embodiment, there aren't two resource blocks in the given resource block set with associated CORESETs being configured with unequal CORESETPoolIndexes.

In one embodiment, if a CORESET associated with a resource block in the given resource block set is configured with a CORESETPoolIndex equal to 0, the first-type index corresponding to the given resource block set is equal to 0.

In one embodiment, if a CORESET associated with any resource block in the given resource block set is not configured with a CORESETPoolIndex, the first-type index corresponding to the given resource block set is equal to 0.

In one embodiment, if there isn't any resource block in the given resource block set with an associated CORESET being configured with a CORESETPoolIndex equal to 1, the first-type index corresponding to the given resource block set is equal to 0.

In one embodiment, if a CORESET associated with a resource block in the given resource block set is configured with a CORESETPoolIndex equal to 1, the first-type index corresponding to the given resource block set is equal to 1.

In one embodiment, if the first node is configured with a CORESET in the first sub-band and the CORESET is not configured with a CORESETPoolIndex, the CORESET belongs to both the first resource block set and the second resource block set.

In one embodiment, the first-type index corresponding to the given resource block set is a CORESET-ID associated with any resource block comprised by the given resource block set.

In one embodiment, any two resource blocks in the given resource block set are associated with a same CORESET.

In one embodiment, a search space sets group index configured for one or more resource blocks comprised by the given resource block set is used to determine a second-type index corresponding to the given resource block set.

In one embodiment, the second-type index corresponding to the given resource block set is a search space sets group index configured to any resource block comprised by the given resource block set.

In one embodiment, the second-type index corresponding to the given resource block set is a search space sets group index equally configured to all resource blocks comprised by the given resource block set.

In one embodiment, any resource block in the given resource block set is configured with one or two search space sets group indexes.

In one embodiment, any two resource blocks in the given resource block set are configured with a same search space sets group index.

In one embodiment, any resource block in the given resource block set is configured with a search space sets group index, or is not configured with any search space sets group index; for any two given resource blocks in the given resource block set, if both given resource blocks are configured with search space sets group indexes, the search space sets group indexes configured for two given resource blocks are equal.

In one embodiment, any resource block in the given resource block set is not configured with a search space sets group index.

In one embodiment, if any resource block in the given resource block set is not configured with a search space sets group index, the second-type index corresponding to the given resource block set is equal to a given value, and the given value is an integer unequal to either 0 or 1.

In one subembodiment, the given value is a fixed one.

In one embodiment, any two resource blocks in the given resource block set belong to a same search space set group.

In one embodiment, the given resource block set comprises only one resource block, and the second-type index corresponding to the given resource block set is a search space set index corresponding to the only one resource block.

In one embodiment, the second-type index corresponding to the first resource block set is equal to 0, while the second-type index corresponding to the second resource block set is equal to 1.

In one embodiment, the second-type index corresponding to the first resource block set is equal to 1, while the second-type index corresponding to the second resource block set is equal to 0.

Embodiment 21

Embodiment 21 illustrates a schematic diagram of a given serving cell corresponding to a third-type index according to one embodiment of the present disclosure; as shown in FIG.

21. In Embodiment 21, the given serving cell is any one of the first serving cell, the second serving cell or a serving cell to which the first signaling belongs.

In one embodiment, the given serving cell is the first serving cell.

In one embodiment, the given serving cell is the second serving cell.

In one embodiment, the given serving cell is a serving cell to which the first signaling belongs.

In one embodiment, the given serving cell is added by the first node.

In one embodiment, the given serving cell is a Primary serving Cell (PCell) for the first node.

In one embodiment, the first node performs SCell addition for the given serving cell.

In one embodiment, a latest sCellToAddModList or sCellToAddModListSCG received by the first node comprises the given serving cell.

In one embodiment, the first node is assigned with a SCellIndex or a ServCellIndex for the given serving cell.

In one embodiment, an index of the given serving cell is a CellIdentity.

In one embodiment, an index of the given serving cell is a PhysCellId.

In one embodiment, an index of the given serving cell is a SCellIndex.

In one embodiment, an index of the given serving cell is a ServCellIndex.

In one embodiment, the third-type index is a non-negative integer.

In one embodiment, the third-type index is a non-negative integer no greater than 31.

In one embodiment, the third-type index comprises a serving cell index.

In one embodiment, the third-type index comprises a SCellIndex.

In one embodiment, the third-type index comprises a ServCellIndex.

In one embodiment, the third-type index comprises a CellIdentity.

In one embodiment, the third-type index comprises a PhysCellId.

In one embodiment, the third-type index comprises a BWP index.

In one embodiment, the third-type index comprises a serving cell group index.

In one embodiment, the third-type index is a non-negative integer no greater than 3.

In one embodiment, an index of the given serving cell is used to determine a third-type index corresponding to the given serving cell.

In one embodiment, the third-type index corresponding to the given serving cell is an index of the given serving cell.

In one embodiment, the third-type index corresponding to the given serving cell is an index of a serving cell group to which the given serving cell belongs.

In one embodiment, the first node is configured with W2 serving cell group(s), W2 being a positive integer; the W2 serving cell group(s) is(are respectively) configured with W2 serving cell group index(es), and the W2 serving cell group(s) is(are respectively) identified by the W2 serving cell group index(es); the given serving cell belongs to a serving cell group of the W2 serving cell group(s), and a third-type identifier for the given serving cell is a serving cell group index configured to the serving cell group to which the given serving cell belongs.

In one embodiment, a switch between a search space set group 0 and a search space set group 1 occurs synchronously among serving cells comprised by any one of the W2 serving cell group(s).

In one embodiment, a switch between a search space set group 0 and a search space set group 1 for a same CORESETPoolIndex occurs synchronously among serving cells comprised by any one of the W2 serving cell group(s).

In one embodiment, a switch between a search space set group 0 and a search space set group 1 for a value of any given said first-type index occurs synchronously among serving cells comprised by any one of the W2 serving cell group(s).

In one embodiment, if the given serving cell belongs to one of the W2 serving cell group(s), the third-type index corresponding to the given serving cell is a serving cell group index configured to a serving cell group to which the given serving cell belongs; if the given serving cell belongs to any one of the W2 serving cell group(s), the third-type index corresponding to the given serving cell is an index of the given serving cell.

In one embodiment, the W2 serving cell group(s) is (are) configured by higher layer signaling(s).

In one embodiment, a name of a signaling for configuring the W2 serving cell group(s) includes PDCCH.

In one embodiment, if the first serving cell and the second serving cell belong to a same serving cell group of the W2 serving cell group(s), the third index is equal to the fourth index; if the first serving cell and the second serving cell do not belong to a same serving cell group of the W2 serving cell group(s), the third index is unequal to the fourth index.

In one embodiment, the W1 serving cells belong to a same serving cell group of the W2 serving cell group(s).

In one embodiment, if the first serving cell is the second serving cell, the third index is equal to the fourth index.

Embodiment 22

Embodiment 22 illustrates a schematic diagram of a first information block according to one embodiment of the present disclosure; as shown in FIG. 22. In Embodiment 22, the first information block is used for determining the first index pair set.

In one embodiment, the first information block is carried by a higher layer signaling.

In one embodiment, the first information block is carried by a Radio Resource Control (RRC) signaling.

In one embodiment, the first information block is carried by a Medium Access Control layer Control Element (MAC CE) signaling.

In one embodiment, the first information block is jointly carried by an RRC signaling and a MAC CE.

In one embodiment, the first information block comprises information in all or part of fields of an Information Element (IE).

In one embodiment, the first information block comprises information in all or part of fields of a PDCCH-Config IE.

In one embodiment, the first information block comprises all or part of information in a searchSpaceSwitchingGroupList-r16 field of a PDCCH-Config IE.

In one embodiment, for any two given index pairs of the K index pairs, the third-type indexes respectively comprised by the two given index pairs are unequal, or the first-type indexes respectively comprised by the two given index pairs are unequal, or the third-type indexes and the first-type indexes respectively comprised by the two given index pairs are unequal.

In one embodiment, among the K index pairs there are two index pairs by which the third-type indexes comprised are equal.

In one embodiment, among the K index pairs there are two index pairs by which the third-type indexes comprised are unequal.

In one embodiment, the first information block comprises a first bit field, and the first bit field indicates each index pair in the first index pair set; the first bit field comprises a positive integer number of bit(s).

In one embodiment, the first information block comprises a second bit field, and the second bit field indicates P1 index group(s), P1 being a positive integer; any of the P1 index group(s) is used to determine one or more index pairs out of the K index pairs; any of the P1 index group(s) comprises one index or two; for any given index group of the P1 index group(s), if the given index group only comprises an index, the given index group comprises the third-type index; if the given index group comprises two indexes, the given index group comprises the third-type index and the first-type index; the second bit field comprises a positive integer number of bit(s).

In one subembodiment, P1 is equal to K.

In one subembodiment, P1 is less than K.

In one subembodiment, if the given index group only comprises one said third-type index, the K index pairs include a first reference index-second reference index pair and the first reference index-third reference index pair; the first reference index is the third-type index comprised by the given index group, while the second reference index and the third reference index are two said first-type indexes respectively, the second reference index and the third reference index respectively being equal to 0 and 1.

In one subembodiment, if the given index group comprises one said third-type index and one said first-type index, the K index pairs include a first reference index-fourth reference index pair; the first reference index is the third-type index comprised by the given index group, and the fourth reference index is the first-type index comprised by the given index group.

Embodiment 23

Embodiment 23 illustrates a schematic diagram of a first index, a second index, a third index and a fourth index jointly being used to determine whether a second-type index corresponding to a target resource block set aligns with a second-type index corresponding to a second resource block set according to one embodiment of the present disclosure; as shown in FIG. 23. In Embodiment 23, if the fourth-index-the second index pair belongs to the first index pair set, the second-type index corresponding to the target resource block set aligns with the second-type index corresponding to the second resource block set; if the fourth-index-the second index pair does not belong to the first index pair set, the second-type index corresponding to the target resource block set is not aligned with the second-type index corresponding to the second resource block set.

Embodiment 24

Embodiment 24 illustrates a schematic diagram of a first index, a second index, a third index and a fourth index jointly being used to determine whether a second-type index corresponding to a target resource block set aligns with a second-type index corresponding to a second resource block set according to one embodiment of the present disclosure;

as shown in FIG. 24. In Embodiment 24, if the third index is equal to the fourth index and the first index is equal to the second index, the second-type index corresponding to the target resource block set aligns with the second-type index corresponding to the second resource block set; if the third index is equal to the fourth index and the first index is unequal to the second index, the second-type index corresponding to the target resource block set is not aligned with the second-type index corresponding to the second resource block set.

In one embodiment, when the third index is unequal to the fourth index, the second-type index corresponding to the target resource block set is not aligned with the second-type index corresponding to the second resource block set.

In one embodiment, if the third index is unequal to the fourth index, the second-type index corresponding to the target resource block set is not aligned with the second-type index corresponding to the second resource block set.

Embodiment 25

Embodiment 25 illustrates a schematic diagram of a first signaling, a first reference time window and a first reference time according to one embodiment of the present disclosure; as shown in FIG. 25. In Embodiment 25, the first signaling is used by the first node for determining the first reference time window, an end of the first reference time window is used by the first node for determining the first reference time, and an end of the second time window is no later than the first reference time.

In one embodiment, when and only when the second-type index corresponding to the second resource block set is equal to 1 is the first signaling used for determining the first reference time window.

In one embodiment, if the second-type index corresponding to the second resource block set is equal to 1, the first signaling is used to determine the first reference time window.

In one embodiment, when and only when the second-type index corresponding to the second resource block set is equal to 1 is the first reference time used for determining an end of the second time window.

In one embodiment, if the second-type index corresponding to the second resource block set is equal to 1, the first reference time is used to determine an end of the second time window.

In one embodiment, the first reference time window comprises a positive integer number of the third-type reference slot(s).

In one embodiment, the first reference time window comprises a positive integer number of fourth-type reference slot(s), the fourth-type reference slot being a slot whose corresponding subcarrier spacing is a subcarrier spacing corresponding to the first signaling.

In one embodiment, an end of the second time window is the first reference time.

In one embodiment, an end of the second time window is earlier than the first reference time.

In one embodiment, the first reference time is an end of the first reference time window.

In one embodiment, the first reference time is an end time of a last time unit occupied by the first reference time window.

In one embodiment, the first reference time is a start time of an earliest time unit with the start time no earlier than an end of the first reference time window.

In one embodiment, a second symbol is a last multicarrier symbol occupied by the first reference time window, and the first reference time is a start time of an earliest time unit after at least P1 symbols subsequent to the second symbol.

In one subembodiment, a time interval between the first reference time and an end time of the second symbol is no smaller than P1 symbols.

In one embodiment, a length of the second symbol is determined on the basis of a first reference subcarrier spacing.

In one embodiment, a length of the second symbol is determined on the basis of a second reference subcarrier spacing.

In one embodiment, the second symbol is a multicarrier symbol for a first reference subcarrier spacing.

In one embodiment, the second symbol is a multicarrier symbol for a second reference subcarrier spacing.

In one embodiment, the first signaling comprises a second bit string, and the second bit string in the first signaling indicates the first reference time window.

In one embodiment, the second bit string in the first signaling indicates a channel occupancy duration.

In one embodiment, the second bit string in the first signaling indicates a Slot Format Indicator (SFI).

In one embodiment, the first signaling comprises a second field, and the second field in the first signaling indicates M2 bit strings, M2 being a positive integer greater than 1; the second bit string is one of the M2 bit strings.

In one embodiment, any of the M2 bit strings corresponds to a said third-type index.

In one embodiment, any of the M2 bit strings corresponds to a said third-type index-the first-type index pair.

In one embodiment, the second bit string corresponds to the third index.

In one embodiment, the second bit string corresponds to the third index-the first index pair.

In one embodiment, a position of the second bit string in the M2 bit strings is configured by a higher layer signaling.

In one embodiment, a name of a higher layer signaling for configuring a position of the second bit string in the M2 bit strings includes SlotFormat.

In one embodiment, the second bit string comprises a positive integer number of bit(s).

In one embodiment, an end of the first reference time window is an end time of a channel occupancy duration.

In one embodiment, W3 time windows respectively correspond to W3 serving cells of W1 serving cells, W1 being a positive integer greater than 1 and W3 being a positive integer no greater than W1 and greater than 1; the W3 time windows share a same start time, each of the W1 serving cells is added by the first node; the first serving cell is one of the W1 serving cells; the first reference time window is one of the W3 time windows with an earliest end time.

In one subembodiment, W3 is less than W1.

In one subembodiment, W3 is equal to W1.

In one subembodiment, W3 subcarrier spacings respectively correspond to W3 serving cells; and the W3 subcarrier spacings are respectively used to determine lengths of the W3 time windows.

In one subembodiment, the W3 subcarrier spacings are respectively configured by higher layer signalings.

In one subembodiment, any of the W3 subcarrier spacings is a smallest one of subcarrier spacings corresponding to all BWPs configured in a corresponding serving cell.

In one subembodiment, the W3 subcarrier spacings are respectively subcarrier spacings corresponding to active BWPs in the W3 serving cells.

Embodiment 26

Embodiment 26 illustrates a schematic diagram of a first node configuring a first counter according to one embodiment of the present disclosure; as shown in FIG. 26. In Embodiment 26, upon detection of the first signaling, the first node sets the first counter's value as the first time length and decrements the first counter by 1 for each passed second-type reference slot; the third reference subcarrier spacing is used to determine a length of a said second-type reference slot; a time of expiration of the first counter is used to determine the second reference time, and an end of the second time window is no later than the second reference time.

In one embodiment, the phrase of setting a first counter's value to a first time length means initializing the first counter and setting an initialized value of the first counter to the first time length.

In one embodiment, the first node decrements the first counter by 1 for each second-type reference slot passed only after initializing the first counter.

In one embodiment, when and only when the second-type index corresponding to the second resource block set is equal to 1 will the first node set the first counter's value to the first time length after detecting the first signaling.

In one embodiment, if the second-type index corresponding to the second resource block set is equal to 1, the first node will set the first counter's value to the first time length after detecting the first signaling.

In one embodiment, when and only when the second-type index corresponding to the second resource block set is equal to 1 will the second reference time be used to determine an end of the second time window.

In one embodiment, the first time length is serving cell-common.

In one embodiment, the first time length is configured per serving cell.

In one embodiment, the first time length is serving-cell group-common.

In one embodiment, the first time length is configured per serving cell group.

In one embodiment, the first time length is configured by a higher layer signaling.

In one embodiment, the first time length is configured by an RRC signaling.

In one embodiment, a name of a higher layer signaling for configuring the first time length includes PDCCH.

In one embodiment, a name of a higher layer signaling for configuring the first time length includes SlotFormat.

In one embodiment, the first time length is a positive integer.

In one embodiment, the first time length is measured by a unit of the second-type reference slot.

In one embodiment, the second-type reference slot is a slot corresponding to the third reference subcarrier spacing.

In one embodiment, the first serving cell is one of W1 serving cells, W1 being a positive integer greater than 1, and the W1 serving cells are added by the first node; W1 time lengths respectively correspond to the W1 serving cells; the first time length is a shortest or a longest time length of the W1 time lengths; subcarrier spacings corresponding to active BWPs in the W1 serving cells are respectively used for determining the W1 time lengths.

In one embodiment, for any given second-type reference slot, when and only when the first node monitors a PDCCH in a search space set with a corresponding search space sets group index being 1 in the given second-type reference slot will the first node decrement the first counter by 1 upon an end of the given second-type reference slot.

In one embodiment, the first serving cell is one of W1 serving cells, W1 being a positive integer greater than 1, and the W1 serving cells are added by the first node; the third reference subcarrier spacing is a smallest one of subcarrier spacings corresponding to active BWPs in the W1 serving cells.

In one embodiment, the first serving cell is one of W1 serving cells, W1 being a positive integer greater than 1, and the W1 serving cells are added by the first node; the third reference subcarrier spacing is a smallest one of subcarrier spacings corresponding to all BWPs configured in the W1 serving cells.

In one embodiment, an end of the second time window is the second reference time.

In one embodiment, an end of the second time window is earlier than the second reference time.

In one embodiment, an end of the second time window is an earlier one of the first reference time and the second reference time.

In one embodiment, the second reference time is a time of expiration of the first counter.

In one embodiment, the second reference time is an end time of a time unit in which the first counter is expired.

In one embodiment, a second time unit is a time unit in which the first counter is expired, and the second reference time is a start time of an earliest time unit after at least P1 symbols subsequent to the second time unit.

In one subembodiment, a time interval between the second reference time and an end time of the second time unit is no smaller than P1 symbols.

Embodiment 27

Embodiment 27 illustrates a schematic diagram of a first signaling, a first reference signal group and a target resource block set according to one embodiment of the present disclosure; as shown in FIG. 27. In Embodiment 27, the first signaling is used by the first node for determining the first reference signal group; the first reference signal group is used by the first node for determining the target resource block set from the third resource block set.

In one embodiment, when and only when the second-type index corresponding to the target resource block set is not aligned with the second-type index corresponding to the second resource block set will the first reference signal group be used for determining the target resource block set from the third resource block set.

In one embodiment, when and only when the second-type index corresponding to the target resource block set is not aligned with the second-type index corresponding to the second resource block set and the third index is equal to the fourth index will the first reference signal group be used for determining the target resource block set from the third resource block set.

In one embodiment, the third resource block set corresponds to a said first-type index and a said third-type index, the first-type index corresponding to the third resource block set is the second index, and the third-type index corresponding to the third resource block set is the fourth index.

In one embodiment, the target resource block set comprises all resource blocks comprised in the third resource block set.

In one embodiment, the target resource block set comprises only some resource blocks comprised in the third resource block set.

In one embodiment, the first reference signal group comprises one or more than one reference signal.

In one embodiment, any reference signal in the first reference signal group comprises a Channel State Information-Reference Signal (CSI-RS) or a Synchronisation Signal/physical broadcast channel Block (SSB).

In one embodiment, an indicator of any reference signal in the first reference signal group is either a CSI-RS Resource Indicator (CRI) or a SSB Resource indicator (SSBRI).

In one embodiment, the first signaling comprises a bit field, and the bit field indicates each reference signal in the first reference signal group.

In one subembodiment, the bit field indicates an indicator of each reference signal in the first reference signal group.

In one embodiment, an antenna port of DMRS of the first signaling is used to determine the first reference signal group.

In one embodiment, any reference signal in the first reference signal group and an antenna port of DMRS of the first signaling are Quasi-Co-Located (QCL).

In one embodiment, any reference signal in the first reference signal group and an antenna port of DMRS of the first signaling are QCL, corresponding to QCL-TypeD.

In one embodiment, a time-frequency resource occupied by the first signaling determines the first reference signal group.

In one embodiment, a Transmission Configuration Indicator (TCI) state corresponding to a CORESET to which the first signaling belongs indicates a first reference signal; any reference signal in the first reference signal group is QCLed with the first reference signal.

In one subembodiment, any reference signal in the first reference signal group is QCLed with the first reference signal, corresponding to QCL-TypeD.

In one embodiment, the target resource block set comprises resource block(s) of which each fulfills a first condition in the third resource block set.

In one embodiment, the first condition comprises: for any given resource block fulfilling the first condition in the third resource block set, there isn't any reference signal comprised in the first reference signal set being QCL with a reference signal indicated by a TCI state of the given resource block.

In one embodiment, the first condition comprises: for any given resource block fulfilling the first condition in the third resource block set, there isn't any reference signal comprised in the first reference signal set being QCL, let alone corresponding to QCL-TypeD, with a reference signal indicated by a TCI state of the given resource block.

In one embodiment, the first reference signal set comprises P2 reference signal(s), P2 being a positive integer, and the P2 reference signal(s) corresponds(correspond) to P2 reference signal group(s) respectively.

In one subembodiment, the first condition comprises: for any given resource block fulfilling the first condition in the third resource block set, there isn't a reference signal comprised in the P2 reference signal group(s) being QCL with a reference signal indicated by a TCI state of the given resource block.

In one subembodiment, the first condition comprises: for any given resource block fulfilling the first condition in the third resource block set, there isn't a reference signal comprised in the P2 reference signal group(s) being QCL, let alone corresponding to QCL-TypeD, with a reference signal indicated by a TCI state of the given resource block.

In one embodiment, for any given reference signal in the first reference signal set, a reference signal group corresponding to the given reference signal is configured by a higher layer signaling.

In one embodiment, any one of the P2 reference signal group(s) comprises one or more reference signals.

In one embodiment, any reference signal in the P2 reference signal group(s) is a CSI-RS or an SSB.

Embodiment 28

Figures 28, 29:
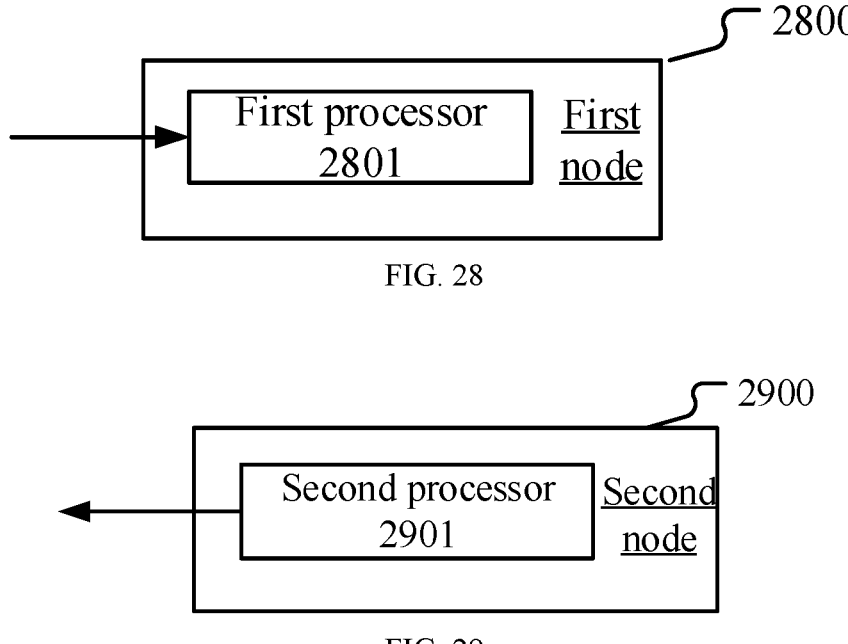
FIG. 28 illustrates a structure block diagram of a processing device in a first node according to one embodiment of the present disclosure.
FIG. 29 illustrates a structure block diagram of a processing device in a second node according to one embodiment of the present disclosure.

Embodiment 28 illustrates a structure block diagram of a processing device in a first node according to one embodiment of the present disclosure; as shown in FIG. 28. In FIG. 28, a processing device 2800 in a first node comprises a first processor 2801.

In Embodiment 28, the first processor 2801 monitors a first-type signaling in a first resource block in a first time window in a first sub-band, and receives a first signaling in a first resource block, monitors a second-type signaling in a second resource block set in a second time window in the first sub-band, and monitors a third-type signaling in a target resource block set in a third time window in a second sub-band.

In Embodiment 28, the first signaling is used by the first node for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the first processor 2801 receives a first information block; herein, the first information block is used to determine a first index pair set; the first index pair set comprises K index pairs, K being a positive integer greater than 1; any index pair in the first index pair set comprises one said third-type index and one said first-type index; the third index-the first index pair belongs to the first index pair set; when the fourth index-the second index pair belongs to the first index pair set, the second-type index corresponding to the target resource block set aligns with the second-type index corresponding to the second resource block set; when the fourth index-the second index pair does not belong to the first index pair set, the second-type index corresponding to the target resource block set does not align with the second-type index corresponding to the second resource block set.

In one embodiment, when the third index is equal to the fourth index and the first index is equal to the second index, the second-type index corresponding to the target resource block set aligns with the second-type index corresponding to the second resource block set; when the third index is equal to the fourth index and the first index is unequal to the second index, the second-type index corresponding to the target resource block set does not align with the second-type index corresponding to the second resource block set.

In one embodiment, the first signaling is used to determine a first reference time window, an end of the first reference time window is used to determine a first reference time, and an end of the second time window is no later than the first reference time.

In one embodiment, the first processor 2801 configures a first counter's value to a first time length after the first signaling is detected.

In one embodiment, the first processor 2801 decrements the first counter by 1 for each second-type reference slot passed; herein, a third reference subcarrier spacing (SCS) is used to determine a length of one said second-type reference slot; a time of expiration of the first counter is used to determine a second reference time, and an end of the second time window is no later than the second reference time.

In one embodiment, the first signaling is used to determine a first reference signal group; any resource block comprised by the target resource block set is a resource block in a third resource block set; the first reference signal group is used to determine the target resource block set from the third resource block set.

In one embodiment, the first node is a UE.

In one embodiment, the first node is a relay node.

In one embodiment, the first processor 2801 comprises at least one of the antenna 452, the receiver 454, the receiving processor 456, the multi-antenna receiving processor 458, the controller/processor 459, the memory 460 or the data source 467 in Embodiment 4.

Embodiment 29

Embodiment 29 illustrates a structure block diagram of a processing device in a second node according to one embodiment of the present disclosure; as shown in FIG. 29. In FIG. 29, a processing device 2900 in a second node comprises a second processor 2901.

In Embodiment 29, the second processor 2901 transmitting a first-type signaling in a first resource block set in a first time window in a first sub-band, or, drops transmitting the first-type signaling in the first resource block set in the first time window in the first sub-band; the second processor 2901 transmits a first signaling in a first resource block; the second processor 2901 transmits a second-type signaling in a second resource block set in a second time window in the first sub-band, or, drops transmitting the second-type signaling in the second resource block set in the second time window in the first sub-band; and the second processor 2901 transmits a third-type signaling in a target resource block set in a third time window in a second sub-band, or, drops transmitting the third-type signaling in the target resource block set in the third time window in the second sub-band.

In Embodiment 29, the first signaling is used for determining to monitor the second-type signaling in the second resource block set in the second time window in the first sub-band; the first signaling is used to determine a first index and a third index, the first index being a first-type index, and the third index being a third-type index; any one of the first resource block set, the second resource block set and the target resource block set corresponds to a said first-type index and a second-type index; the first-type index corresponding to the first resource block set and the first-type index corresponding to the second resource block set are both equal to the first index, while the second-type index corresponding to the first resource block set is unequal to the second-type index corresponding to the second resource block set; the first-type index corresponding to the target resource block set is equal to a second index; the first sub-band and the second sub-band respectively belong to a first serving cell and a second serving cell, and the first serving cell and the second serving cell respectively correspond to two said third-type indexes; the third-type index corresponding to the first serving cell is equal to the third index, and the third-type index corresponding to the second serving cell is equal to a fourth index; the first index, the second index, the third index and the fourth index are jointly used to determine whether the second-type index corresponding to the target resource block set aligns with the second-type index corresponding to the second resource block set; the first signaling is used to determine a start of the second time window, a start of the third time window being the same as the start of the second time window.

In one embodiment, the second processor 2901 transmits a first information block; herein, the first information block is used to determine a first index pair set; the first index pair set comprises K index pairs, K being a positive integer greater than 1; any index pair in the first index pair set comprises one said third-type index and one said first-type index; the third index-the first index pair belongs to the first index pair set; when the fourth index-the second index pair belongs to the first index pair set, the second-type index corresponding to the target resource block set aligns with the second-type index corresponding to the second resource block set; when the fourth index-the second index pair does not belong to the first index pair set, the second-type index corresponding to the target resource block set does not align with the second-type index corresponding to the second resource block set.

In one embodiment, when the third index is equal to the fourth index and the first index is equal to the second index, the second-type index corresponding to the target resource block set aligns with the second-type index corresponding to the second resource block set; when the third index is equal to the fourth index and the first index is unequal to the second index, the second-type index corresponding to the target resource block set does not align with the second-type index corresponding to the second resource block set.

In one embodiment, the first signaling is used to determine a first reference time window, an end of the first reference time window is used to determine a first reference time, and an end of the second time window is no later than the first reference time.

In one embodiment, a target receiver of the first signaling configures a first counter's value to a first time length after the first signaling is detected.

In one embodiment, the first counter is decremented by 1 for each second-type reference slot passed; a third reference subcarrier spacing (SCS) is used to determine a length of one said second-type reference slot; a time of expiration of the first counter is used to determine a second reference time, and an end of the second time window is no later than the second reference time.

In one embodiment, the first signaling is used to determine a first reference signal group; any resource block comprised by the target resource block set is a resource block in a third resource block set; the first reference signal group is used to determine the target resource block set from the third resource block set.

In one embodiment, the second node is a base station.

In one embodiment, the second node is a UE.

In one embodiment, the second node is a relay node.

In one embodiment, the second processor 2901 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for use by a user equipment (UE), the method comprising:
   monitoring in a PDCCH for a first downlink control information (DCI) in a first search space set in a first time window in a first sub-band of a first serving cell;
   receiving, the first DCI from a first transmission reception point (TRP), the first DCI indicating a control resource set (CORESET) type of index and a serving cell type of index;
   monitoring in the PDCCH for a second DCI in a second search space set in a second time window in the first sub-band, the monitoring for the second DCI based on the received first DCI and the indicated CORESET type of index and the serving cell type of index;
   monitoring in the PDCCH for a third DCI in a target search space set in a third time window in a second sub-band of a second serving cell;

wherein any one of the first search space set, the second search space set and the target search space correspond to the CORESET type index and a search space set type of index; and determining the target search space set type of index aligns with an index of the second search space set in response to the CORESET type index for the first search space set and the second search space set being equal and the search space set type of index for the first search space set and the second search space set being unequal.

2. The method of claim 1, wherein the CORESET type index comprises a CORESETPoolIndex.

3. The method of claim 1, wherein the CORESET type index comprises a CORESET-ID.

4. The method of claim 1, wherein the search space set type of index comprises a search space sets group index, or is 0, or 1 or 2.

5. A user equipment (UE) comprising:

a receiver; and a processor in communication with the receiver, wherein the receiver and the processor are configured to:

monitor in a PDCCH for a first downlink control information (DCI) in a first search space set in a first time window in a first sub-band of a first serving cell;

receive, the first DCI from a first transmission reception point (TRP), the first DCI indicating a control resource set (CORESET) type of index and a serving cell type of index;

monitor in the PDCCH for a second DCI in a second search space set in a second time window in the first sub-band, the monitoring for the second DCI based on the received first DCI and the indicated CORESET type of index and the serving cell type of index;

monitor in the PDCCH for a third DCI in a target search space set in a third time window in a second sub-band of a second serving cell;

wherein any one of the first search space set, the second search space set and the target search space correspond to the CORESET type index and a search space set type of index; and determine the target search space set type of index aligns with an index of the second search space set in response to the CORESET type index for the first search space set and the second search space set being equal and the search space set type of index for the first search space set and the second search space set being unequal.

6. The UE of claim 5, wherein the CORESET type index comprises a CORESETPoolIndex.

7. The UE of claim 5, wherein the CORESET type index comprises a CORESET-ID.

8. The UE of claim 5, wherein the search space set type of index comprises a search space sets group index, or is 0, or 1 or 2.

* * * * *